(12) United States Patent
Shimazaki et al.

(10) Patent No.: US 7,380,093 B2
(45) Date of Patent: May 27, 2008

(54) STORAGE SYSTEM INCLUDING A DEVICE, DATA MANAGEMENT UNIT, CONTROL UNIT AND/OR PRIMARY COMPUTER, AND METHOD, FOR ALLOCATING STORAGE AREA

(75) Inventors: Koichi Shimazaki, Yokohama (JP); Yukio Nakano, Oyama (JP)

(73) Assignee: Hitachi, Ltd., Tokyo (JP)

( * ) Notice: Subject to any disclaimer, the term of this patent is extended or adjusted under 35 U.S.C. 154(b) by 430 days.

(21) Appl. No.: 11/167,274

(22) Filed: Jun. 28, 2005

(65) Prior Publication Data
US 2006/0224853 A1 Oct. 5, 2006

(30) Foreign Application Priority Data
Apr. 1, 2005 (JP) ............................ 2005-106034

(51) Int. Cl.
*G06F 12/00* (2006.01)
(52) U.S. Cl. ...................... 711/171; 711/170; 711/172; 711/173; 711/156
(58) Field of Classification Search ................ 711/171, 711/170, 172, 173, 112, 156
See application file for complete search history.

(56) References Cited

U.S. PATENT DOCUMENTS

| | | | | |
|---|---|---|---|---|
| 6,223,300 B1* | 4/2001 | Gotoh | ............................ | 714/5 |
| 6,925,462 B2* | 8/2005 | Nishikawa et al. | ............ | 707/3 |
| 7,107,427 B2* | 9/2006 | Nakano et al. | ............. | 711/170 |
| 7,188,201 B2* | 3/2007 | Harima et al. | .............. | 710/104 |
| 2003/0236884 A1* | 12/2003 | Yamamoto et al. | ......... | 709/225 |
| 2005/0033936 A1* | 2/2005 | Nakano et al. | ............. | 711/170 |

FOREIGN PATENT DOCUMENTS

JP 2001-142648 5/2001

\* cited by examiner

*Primary Examiner*—Hong Kim
(74) *Attorney, Agent, or Firm*—Antonelli, Terry, Stout & Kraus, LLP.

(57) ABSTRACT

The present invention relates to a method for allocating volumes having a suitable physical location relationship based on a method of use of files by applications.

When an application management unit receives an application area expansion request, a distribution request table is created based on a preset distribution rule table and a file management table. The distribution rule table includes a flag indicating whether or not files stored on a logical disk for allocation, and existing files, may be stored on the same disk drive. A storage management unit selects, in consideration of the distribution request table, a logical disk having suitable physical attributes from unused logical disks satisfying basic conditions such as requested size and RAID configuration. The selected logical disk is allocated to the application.

16 Claims, 24 Drawing Sheets

FIG. 4

DISK MANAGEMENT TABLE 323(211)

| LOGICAL DISK NUMBER | SIZE | CONFIGURATION | STATUS | PHYSICAL DISK NUMBER | PATH INFORMATION |
|---|---|---|---|---|---|
| LD#0 | 10000 | RAID1 | IN USE | PD#0-PD#1 | PORT #0 |
| LD#1 | 2000 | RAID5 | IN USE | PD#2-PD#5 | PORT #1 |
| LD#2 | 6000 | RAID5 | UNUSED | PD#2-PD#5 | PORT #1 |
| LD#3 | 8000 | RAID1 | IN USE | PD#6-PD#7 | PORT #2 |
| LD#4 | 2000 | RAID1 | UNUSED | PD#6-PD#7 | PORT #2 |
| LD#5 | 8000 | RAID5 | UNUSED | PD#8-PD#11 | PORT #3 |
| ... | ... | ... | ... | ... | ... |

FIG. 5

| FILE MANAGEMENT TABLE ||||||| 330 |
|---|---|---|---|---|---|---|
| FILE NAME | FILE TYPE | SERVER PROCESS ID | RDAREA ID | FILE GROUP ID | LOGICAL DISK NUMBER | FILE SIZE |
| f1 | DB | sv1 | rd1 | - | 0 | 500 |
| f2 | DB | sv1 | rd1 | - | 0 | 400 |
| f3 | DB | sv1 | rd2 | - | 1 | 500 |
| f4 | DB | sv1 | rd2 | - | 1 | 500 |
| f5 | DB | sv1 | rd2 | - | 1 | 300 |
| f6 | spd | sv1 | - | spd1 | 2 | 50 |
| f7 | spd | sv1 | - | spd1 | 3 | 50 |
| f8 | spd | sv1 | - | spd2 | 2 | 20 |
| f9 | spd | sv1 | - | spd2 | 3 | 20 |
| f10 | DB | sv2 | rd3 | - | 4 | 500 |
| ... | ... | ... | ... | ... | ... | ... |

| DISTRIBUTION RULE TABLE ||||||
| RULE NUMBER | NEW FILE TYPE | EXISTING FILE TYPE | COMPARED ITEMS | FLAG |
| --- | --- | --- | --- | --- |
| r#1 | DB | DB | RDAREA ID MATCHED | OK |
| r#2 | DB | spd | SERVER PROCESS ID MATCHED | NG |
| r#3 | spd | DB | SERVER PROCESS ID MATCHED | NG |
| r#4 | spd | spd | FILE GROUP ID MATCHED | NG |

| VOLUME MANAGEMENT TABLE |||
| DEVICE FILE NAME | LOGICAL DISK NUMBER | INTERFACE NUMBER |
| --- | --- | --- |
| /dev/rdsk/c0t0d0 | 0 | 1 |
| /dev/rdsk/c0t0d1 | 1 | 0 |
| /dev/rdsk/c0t1d0 | 2 | 0 |

FIG. 14

| | | | | 313A |
|---|---|---|---|---|
| DISTRIBUTION RULE TABLE ||||| 
| RULE NUMBER | NEW FILE TYPE | EXISTING FILE TYPE | COMPARED ITEMS | FLAG |
| r#1 | DB | DB | RDAREA ID MATCHED | -1 |
| r#2 | DB | spd | SERVER PROCESS ID MATCHED | 4 |
| r#3 | spd | DB | SERVER PROCESS ID MATCHED | 4 |
| r#4 | spd | spd | FILE GROUP ID MATCHED | 5 |

FIG. 18

DISK MANAGEMENT TABLE 530

| LOGICAL DISK NUMBER | SIZE | CONFIGURATION | STATUS | PHYSICAL DISK NUMBER | PATH INFORMATION | APPARATUS NUMBER | SW NUMBER | HBA NUMBER |
|---|---|---|---|---|---|---|---|---|
| LD#0 | 10000 | RAID1 | IN USE | PD#0–PD#1 | PORT #0 | #0 | #0 | #0 |
| LD#1 | 2000 | RAID5 | IN USE | PD#2–PD#5 | PORT #1 | #0 | #0 | #0 |
| LD#2 | 6000 | RAID5 | UNUSED | PD#2–PD#5 | PORT #1 | #0 | #0 | #0 |
| LD#3 | 8000 | RAID1 | IN USE | PD#6–PD#7 | PORT #2 | #0 | #0 | #0 |
| LD#4 | 2000 | RAID1 | UNUSED | PD#6–PD#7 | PORT #2 | #0 | #0 | #0 |
| LD#5 | 8000 | RAID5 | UNUSED | PD#8–PD#11 | PORT #3 | #1 | #1 | #1 |
| ... | ... | ... | ... | ... | ... | ... | ... | ... |

FIG. 20

| | | | | | | 540 |
|---|---|---|---|---|---|---|
| FILE MANAGEMENT TABLE ||||||||
| FILE NAME | FILE TYPE | SERVER PROCESS ID | RDAREA ID | FILE GROUP ID | APPARATUS NUMBER | FILE SIZE |
| f1 | DB | sv1 | rd1 | - | 0 | 500 |
| f2 | DB | sv1 | rd1 | - | 0 | 400 |
| f3 | DB | sv1 | rd2 | - | 1 | 500 |
| f4 | DB | sv1 | rd2 | - | 1 | 500 |
| f5 | DB | sv1 | rd2 | - | 1 | 300 |
| f6 | spd | sv1 | - | spd1 | 2 | 50 |
| f7 | spd | sv1 | - | spd1 | 3 | 50 |
| f8 | spd | sv1 | - | spd2 | 2 | 20 |
| f9 | spd | sv1 | - | spd2 | 3 | 20 |
| f10 | DB | sv2 | rd3 | - | 4 | 500 |
| ... | ... | ... | ... | ... | ... | ... |

STORAGE SYSTEM INCLUDING A DEVICE, DATA MANAGEMENT UNIT, CONTROL UNIT AND/OR PRIMARY COMPUTER, AND METHOD, FOR ALLOCATING STORAGE AREA

CROSS REFERENCE TO PRIOR APPLICATION

This application relates to and claims priority from Japanese Patent Application No. 2005-106034 filed on Apr. 1, 2005, the entire disclosure of which is incorporated herein by reference.

BACKGROUND OF THE INVENTION

1. Field of the Invention

The present invention relates to a storage system and a method for allocating storage area.

For example, in order to manage efficiently the rapidly increasing amounts of information in various organizations such as administrative organizations, enterprises, and universities, storage resources are shared between a plurality of computers. The SAN (Storage Area Network), for example, is known as such a system.

The SAN, for example, has a plurality of host computers (hereafter referred to as 'hosts'), and a plurality of storage apparatuses. Data can be transferred between each host and storage apparatus based on, for example, a fiber channel protocol.

The storage apparatuses are also referred to as 'disk array devices' or 'storage subsystems' and the like, and are composed of a large number of physical storage devices disposed in an array. A storage apparatus can provide a plurality of storage areas based on, for example, a RAID (Redundant Array of Independent Disks). A logical volume (logical storage device) being a logical storage area is formed on the physical storage area of each disk drive.

Each host can conduct data I/O using the logical volumes allocated to itself. For example, application programs running on the host (hereafter referred to as 'applications') such as database management programs and the like employ data groups stored on the prescribed logical volumes to achieve the prescribed operations.

In a storage system which can provide a large number of logical volumes to each host, the desired logical volume can be selected and used. In contrast to these advantages, since there are too many possibilities for selection of logical volumes, the user is at a loss as to which logical volume to allocate to which application.

2. Description of the Related Art

A technology in which a management program for managing storage resources within the storage system from a single point is provided, and logical volumes are allocated to each host with this program, is disclosed in Japanese Patent Application Laid-open No. 2001-142648. In the technology disclosed in this patent document, when a new logical volume is required, each host notifies the management program of the necessary volume size and RAID configuration type. The management program selects a logical volume matching the request from the host, and allocates this selected logical volume to the host.

The management program disclosed in the afore-mentioned document receives a request from the host, and allocates a logical volume to that host. Allocation of volumes is therefore hidden from the user, and the user need not be aware of the type and number of physical storage devices.

However, in the conventional technology disclosed in the afore-mentioned document, the broad conditions related to the logical volume such as volume size and RAID configuration can be specified, however, detailed conditions such as position and access path of the physical device comprising the logical volume cannot be specified.

Therefore, when the practical method of use of the application is considered, there is an unresolved problem in that an optimum logical volume cannot be selected for the application. For example, it is desirable that database files and system files employed by the database management program be stored on differing physical storage devices, or on physical storage devices having differing access paths.

When database files and system files are stored on the same physical storage device, data I/O associated with creation of system files, and data I/O with database files, are conducted for the same storage device. Thus, storage device I/O conflict occurs, and response performance deteriorates.

Furthermore, in terms of reliability, important files such as system files are stored on a plurality of logical volumes and thus duplicated. In this case, also, it is desirable that duplicated files be stored on physically different storage devices.

Thus, the practical method of use, and the used content, of the files used by the application is understood by the application, and the method of use and the like differs with application type and the like.

However, in the conventional technology disclosed in the afore-mentioned document, selection of a logical volume in consideration of the method of use of the files by the application is not possible. Thus, with the conventional technology, a problem exists in that there is a possibility that a logical volume unsuitable in terms of reliability and performance will be selected, and a logical volume suitable for the application cannot be selected.

SUMMARY OF THE INVENTION

Therefore, an object of the present invention is to provide a storage system which can provide a suitable storage area in accordance with the characteristics of the data, and a method for allocating storage area. A further object of the present invention is to provide a storage system which can allocate a suitable storage area, and a method for allocating storage area, in consideration of the physical relationship with existing other storage areas and the characteristics of data stored in a new storage area. Further objects of the present invention will become apparent from the embodiments disclosed below.

The storage system according to one aspect of the present invention has a primary computer on which at least one application program is executed, a storage apparatus inducing storage of a plurality of data used by the application program on one or a plurality of storage devices, a storage system connected to the primary computer and the storage apparatus and having a secondary computer controlling allocation of storage areas to application programs, the secondary computer being a device management information management unit for managing device management information related to each storage device, a data management information management unit for managing data management information related to each data, and a control unit controlling allocation of storage areas to application programs. When allocation of a storage area to an application program is requested, the control unit considers the physical relationship between the requested storage area and already existing other storage areas using the data management information and the device management information, selects a storage area in accordance with the characteristics of the data stored in the requested storage area, and issues the prescribed instructions to the primary computer and storage apparatus respectively so that the application program can use the selected storage area.

The storage system can be composed of at least one primary computer, at least one storage apparatus, and at least one secondary computer. The primary computer can be configured, for example, as a server, and can induce execution of one or a plurality of application programs (hereafter referred to as 'applications). The storage apparatus provides a storage area for storing data used by applications (for example, files) to applications. The secondary computer is a management computer for managing storage areas within the storage system. The storage areas are physical storage areas having one or a plurality of storage devices.

Data management information is, for example, information for managing data stored in already existing other storage areas. Data management items can be, for example, data type, information identifying applications using data, and data size and the like.

Device management information is information for managing each storage device. Device management items can be, for example, information identifying a logical volume, the RAID configuration of a logical volume, the status of a logical volume (for example, in use or not), information identifying a storage device comprising a logical volume, and the access path of a logical volume.

When allocation of a storage area for the application is requested, the control unit of the secondary computer considers the physical relationship between the requested storage area and already existing other storage areas, and selects a storage device in accordance with the characteristics of the data stored in the requested storage area.

The physical relationship between the storage area to be selected and other storage areas means, for example, the relationship of the physical configurations comprising these storage areas or related to these storage areas. The physical configuration can be, for example, the location of the physical storage device comprising the storage area, or the physical storage device access path, and the like.

A storage area in accordance with the characteristics of the data is, for example, a storage area in accordance with the method of use and the like of the data. For example, a plurality of data redundantly stored for reasons of fault tolerance is stored in a storage area composed of different physical storage devices, or in a storage area composed of physical storage devices having differing access paths. Furthermore, for example, a plurality of data for which I/O conflict is to be avoided for reasons of improved performance is stored in storage areas having different physical configurations.

In one embodiment, conditions other than the physical location conditions related to the requested storage area are included in the storage area allocation request, and the control unit selects the physical location conditions to suit the characteristics of the data stored in the requested storage area, and selects an unused storage area matching this selected physical location condition.

Conditions other than the physical location conditions can be, for example, storage area size, configuration of that storage area (RAID level), and information identifying the computer and the application required by the storage area. Storage areas can also be selected based on these broad instructions. However, the control unit of the present invention selects, in addition to the other conditions, physical location conditions suited to the characteristics of the data, and selects an unused storage area matching the selected physical location conditions. The other conditions can also be referred to as 'basic conditions'.

Here, the physical location conditions may be, for example, defined as conditions related to the storage device comprising the requested storage area, and for example, can be the location of the physical storage device comprising the storage area, and the access path of the storage device and the like.

The physical location conditions can also comprise information indicating whether or not the requested storage area and the other storage areas are to have different physical distribution attributes. The physical distribution attributes mean, for example, the attributes related to physical positioning within the storage system of the storage area, and can be which storage apparatus in which the storage area exists, which storage device the storage area is composed of, and which access path on which access to the storage area is possible.

In another embodiment of the present invention, the physical location conditions comprise information indicating the relative strength of whether or not the requested storage area and other storage areas are to have different physical distribution attributes. For example, the higher the relative strength value is set, the stronger is the request for a storage area having different physical distribution attributes to the other storage area. Thus, whether or not the storage areas to be selected or created, and the other storage areas already existing are to be physically separated, can be instructed with the information indicating the relative strength.

The control unit can select the requested storage area so that the requested storage area is suited to the logical relationship between the primary data stored in the requested storage area and the secondary data stored in other storage areas and related to the primary data. For example, when the primary data and secondary data are related in such a manner that they are mutually backed up (in other words, when they are duplicated), it is desirable that the storage area in which the primary data is stored has different physical attributes to the storage area in which the secondary data is stored. Furthermore, when I/O conflict occurs between the primary data and the secondary data, it is desirable that the data is stored in storage areas having different physical attributes.

When the primary data and secondary data are related in such a manner that they may be stored on the same storage device, the control unit can select the requested storage device so as to include a storage device comprising another storage device. For example, when the primary data and secondary data are not related in such a manner that they are duplicated, and are not related in such a manner that I/O conflict occurs, the primary data and secondary data can be stored in separate storage areas set in the same storage device.

When the primary data and secondary data are related in such a manner that they are to be stored on differing storage devices, the control unit can select the requested storage area so as to remove the storage device comprising the other storage area.

Conditions other than the physical location conditions related to the storage device to comprise the requested storage area are included in the storage area allocation request, and when the primary data stored in the requested storage area and the secondary data stored in another storage area related to the primary data are related in such a manner that they are to be stored on differing storage devices, the control unit can select a storage area created solely from storage devices not comprising the other storage area and satisfying the other conditions.

The control unit can be composed of a location conditions determination unit determining the physical location conditions related to the storage device to comprise the requested storage area based on preset distribution rules and data management information, and a storage area determination unit determining the requested storage area based on the determined physical location conditions, the other conditions included in the storage area allocation request, and device management information.

The present invention can also be understood as, for example, a management computer managing a storage area allocation method and storage area allocation. All of part of the configuration of the present invention can be configured as a computer program executed by a microcomputer. This computer program can be, for example, fixed on and distributed on recording media such as a hard disk, optical disk, and semiconductor memory and the like, and can also be distributed via communications networks such as the Internet and the like.

BRIEF DESCRIPTION OF THE DRAWINGS

FIG. 4 is a descriptive diagram showing the configuration of the disk management table;

FIG. 5 is a descriptive diagram showing the configuration of the file management table;

FIG. 6 is a descriptive diagram showing the configuration of the distribution rule table;

FIG. 7 is a descriptive diagram showing the configuration of the volume management table;

FIG. 14 is a descriptive diagram showing the configuration of the distribution rule table used in the second embodiment;

FIG. 18 is a descriptive diagram showing the configuration of the disk management table;

FIG. 20 is a descriptive diagram showing the configuration of the file management table;

DESCRIPTION OF THE PREFERRED EMBODIMENTS

Figure 1:
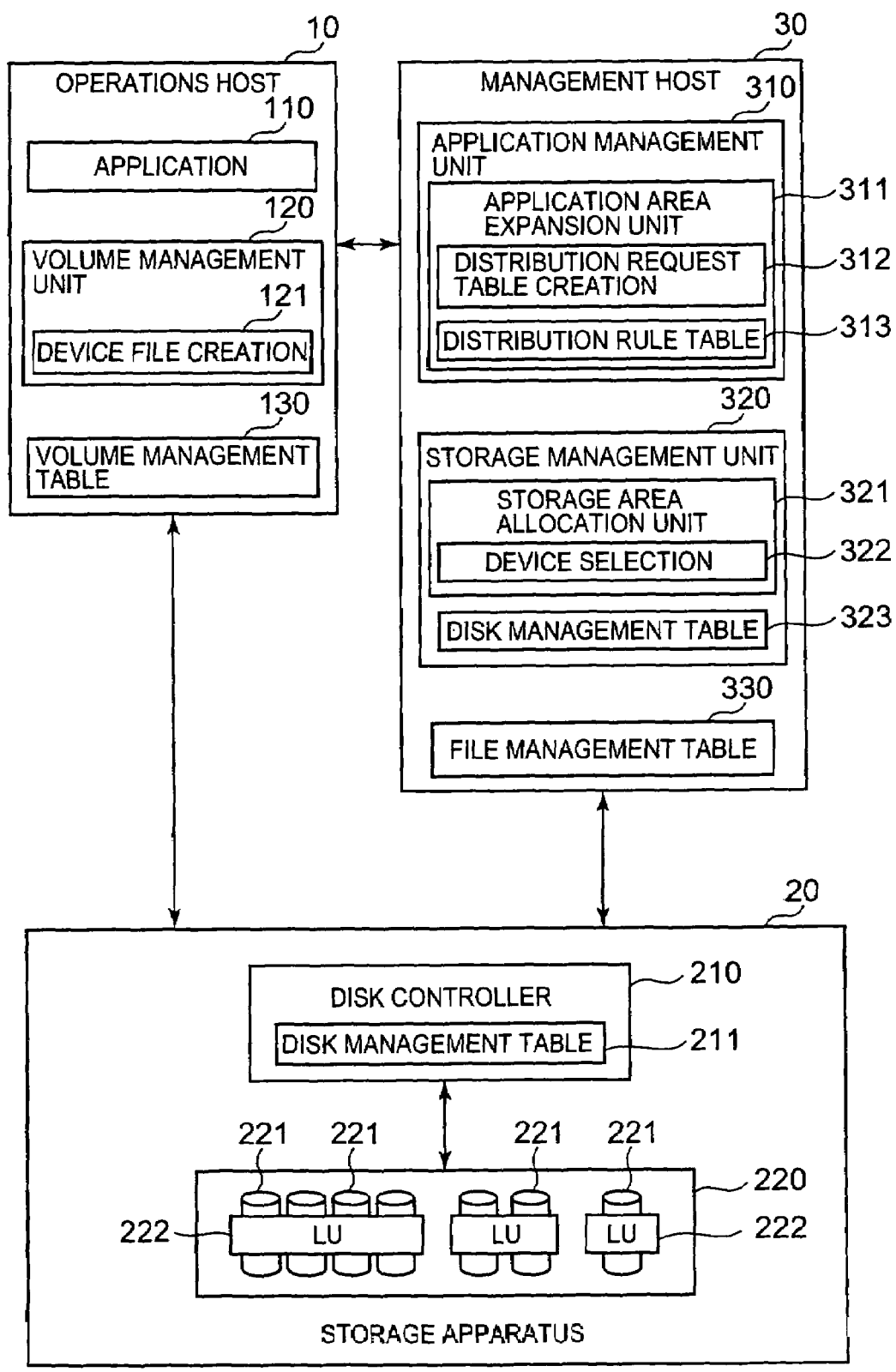
FIG. 1 is a block diagram showing the overall configuration of the storage system of the present invention.

The embodiments of the present invention are described below in reference to the figures. As described below, the present embodiment, has an operations host 10, a storage apparatus 20, and a management host 30, these three components 10 through 30 being mutually connected. When allocation of a volume 222 to an application 110 is requested, the management host 30 considers the physical relationship with already existing other volumes in accordance with the application of the requested volume 222 (the characteristics of the data to be stored), and selects, or creates anew, a volume suited to the application, and provides that volume to the application 110.

The request for allocation of a volume to the application 110, includes, for example, basic conditions such as volume size and RAID configuration and the like. The management host 30 extracts unused volumes 222 matching these basic conditions, and selects a volume having suitable physical attributes in accordance with the volume application from the extracted volumes 222. The user instructing the volume allocation request and the application 110 need only specify the basic conditions, and need not consider the suitability of the physical attributes.

First Embodiment

FIG. 1 is a block diagram showing the overall configuration of the storage system according to the present invention. This storage system can, for example, comprise the operations host 10, the storage apparatus 20, and the management host 30. One of each of these components is shown in FIG. 1, however, a plurality of operations hosts 10 and a plurality of storage apparatuses 20 can be provided.

The operations host 10 is, for example, composed of a server or mainframe, and executes one or a plurality of operational processing. The operations host 10 can be composed of, for example, an application 110, a volume management unit 120, and a volume management table 130. The application 110 can be, for example, a database management program, a webpage creation program, a document creation program, or an image creation program and the like. Execution of a plurality of types of applications 110 can be induced on a single operations host 10.

The volume management unit 120 manages the information for the volumes used by the operations host 10 by using the volume management table 130. Information indicating which application 110 uses which volume is stored in the volume management table 130.

The storage apparatus 20 can be, for example, composed of a disk controller 210 and a storage unit 220. The disk controller 210 controls overall operation of the storage apparatus 20, exchanges information between the operations host 10 and the management host 30, and conducts I/O processing of data and the like with the storage unit 220. The disk controller 210 uses the disk management table 211 to manage the disk drives 221 and the logical disks 222 within the storage unit 220.

The storage unit 220 has a plurality of disk drives 221. Each disk drive 221 and the disk controller 210 are connected by a plurality of paths. Even when any path becomes unusable, the disk controller 210 can access that disk drive 221 via another path.

Each disk drive 221 can be, for example, be composed of various types of physical storage devices such as hard disk drives, flexible disk drives, magnetic tape drives, semiconductor memory drives, optical disk drives, and magneto-optical disk drives and the like, or equivalents. FC (Fibre Channel) disks, SATA (Serial AT Attachment) disks, and SAS (Serial Attached SCSI) disks, for example, can be used in the case of hard disk drives. Furthermore, differing types of disks can be mixed.

Parity groups (also referred to as 'RAID groups') can be formed from groups of a plurality of disk drives 221, for example, three or four disk drives of differing RAID configurations in a group. At least one logical volume ('LU' in the figure) 222 can be set in the storage area provided by the parity groups. This logical volume ((hereafter referred to as a 'volume') 222 corresponds to a 'storage area', and the disk drive 221 corresponds to a 'storage device'. The application 110 is recognized as the access target of the volume 222, and data is written to this volume 222 and read from this volume 222. One volume 222 can also be set in one disk drive 221.

The management host 30 is a computer for managing allocation of volumes 222 to applications 110 from a single point. The management host 30, can be composed of, for example, an application management unit 310, a storage management unit 320, and a file management table 330.

The application management unit 310 provides the necessary instructions for management of information for applications 110 within the storage system, and operation of the applications 110. The application management unit 310 can have an application area expansion unit 311. The application area expansion unit (hereafter referred to as the 'area expansion unit') 311 expands and newly allocates volumes used by the application 110. The area expansion unit 311 has distribution request table creation processing 312 and a distribution rule table 313. As described below, the area expansion unit 311 uses the start button 313 to create a distribution request table, and send the area request list including this created distribution request table to the storage management unit 320.

The storage management unit 320 manages the locations of the disk drive 221 and the volume 222 within the storage system. The storage management unit 320 may comprise, for example, a storage area allocation unit 321 and a disk management table 323. The storage area allocation unit 321 executes device selection processing 322.

Device selection processing 322 is described further below, however device selection processing 322 selects a volume 222 having a physical relationship suited to an existing volume in accordance with the application of the new volume by using the area request list passed from the application management unit 310, and the disk management table 323.

The file management table 330 is a table for managing files used by the application 110. The file management table 330 is described in detail below.

Figure 2:
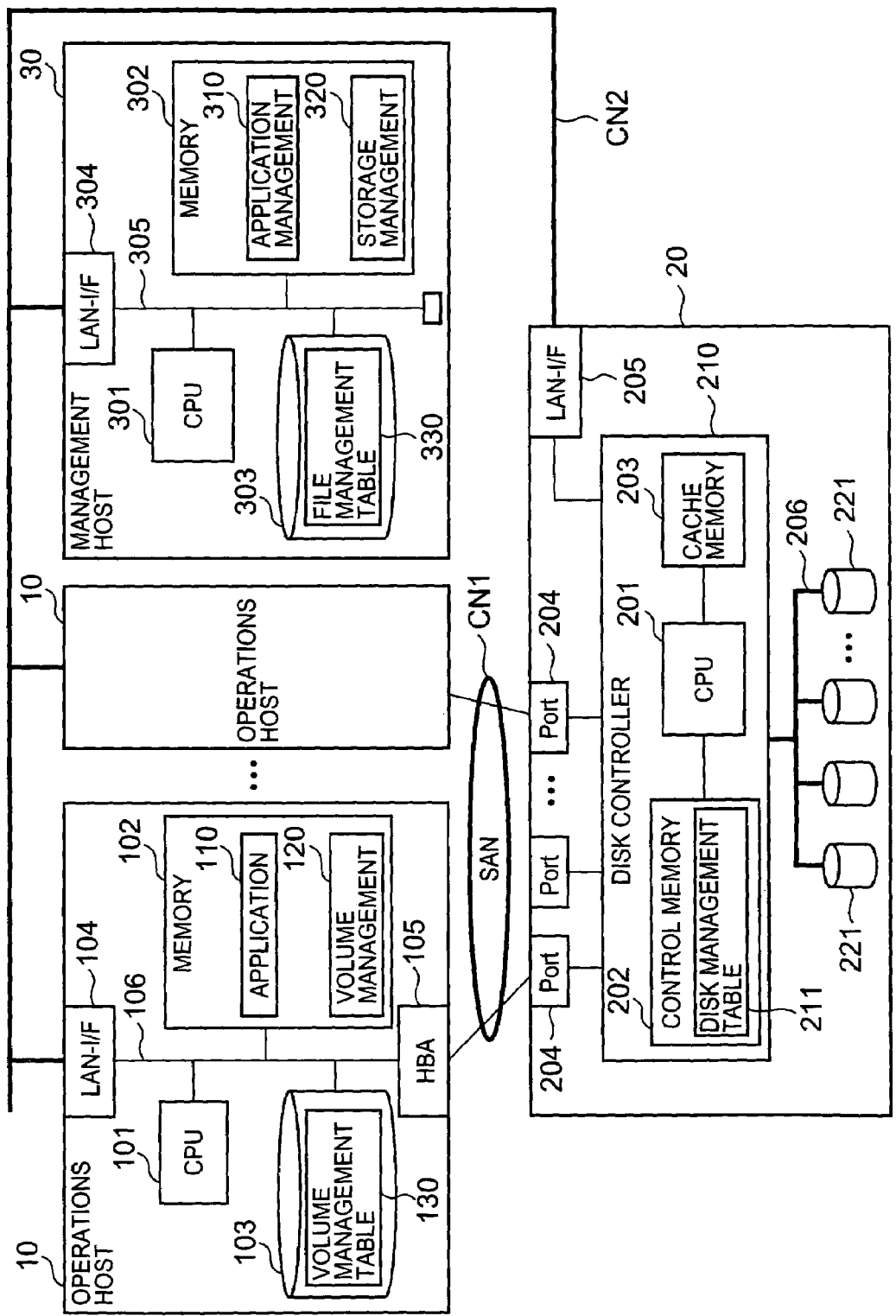
FIG. 2 is a block diagram showing an outline of the network configuration and the hardware configuration of the storage system.

FIG. 2 is a block diagram focusing on the hardware configuration and the network configuration of the storage system. Firstly, in terms of network structure, each operations host 10 is connected to the storage apparatus 20 via the communications network CN1.

This communications network CN1 can be, for example, an FC-SAN (Fibre Channel-SAN) or an IP-SAN (Internet Protocol-SAN) and the like. The operations host 10 communicates with the storage apparatus 20 based on a protocol, for example, a fiber channel protocol, TCP/IP (Transmission Control Protocol/Internet Protocol), ESCON (register trademark), or FICON (register trademark) and the like.

Each operations host 10, the storage apparatus 20, and the management host 30 are mutually connected via another communications network CN2. This communications network CN2 can be referred to as a 'management network', and can be composed of, for example, a LAN (Local Area Network) or a WAN (Wide Area Network) and the like. Each operations host 10, the storage apparatus 20, and the management host 30 can communicate management data based on a protocol, for example TCP/IP and the like.

The hardware configuration is described below. Using a single operations host 10 as an descriptive example, a operations host 10 can be composed of, for example, a CPU (Central Processing Unit) 101, a memory 102, a local disk 103, a LAN interface 104, and an HBA (Host Bus Adapter) 105. These components 101 through 105 are connected by the bus 106.

The memory 102 can be composed of, for example, a ROM (Read Only Memory) and a RAM (Random Access Memory) and the like. The application 110 and the volume management unit 120 program are stored in the memory 102. The CPU 101 realizes the various functions by reading from the memory 102 and executing these programs. The volume management table 130 is stored on the local disk 103, however, it is not restricted to the local disk, and may be stored in the memory 102 provided sufficient freespace is available.

The operations host 10 is connected to the communications network CN2 via the LAN interface 104, and conducts data communications with the management host 30. The operations host 10 can have a plurality of HBAs 105.

The disk controller 210 of the storage apparatus 20 can be composed of, for example, a CPU 201, a control memory 202, and a cache memory 203. In addition to the control program, the disk management table 211 is stored in the control memory 202. The disk management table 211 is sent to the management host 30 at regular or irregular intervals via the communications network CN2. The management host 30 creates the disk management table 323 based on the disk management table 211 acquired from the storage apparatus 20. When, for example, the configuration of the storage unit 220 is changed, the storage apparatus 20 determines a time zone in which the amount of I/O is small, and sends the disk management table 211 to the management host 30.

The CPU 201 controls RAID control and disk access and the like by reading and executing the control program stored in the control memory control memory 202. Data written to the disk drive 221 (write data) and data read from the operations host 10 (read data) and the like is stored in the cache memory 203.

For example, the storage area of any disk drive 221 can also be used as a cache area. Furthermore, part of the cache memory 203 can also act as one or a plurality of logical disks, and be used as a device for which access to the disk drive 221 is unnecessary.

The disk controller 210 can communicate with each operations host 10 via a plurality of ports 204 and the communications network CN1. The disk controller 210 is connected to the management host 30 via the LAN interface 205 and the communications network CN2. The disk controller 210 is connected to each disk drive 221 via a communications network 206 such as a SAN and the like.

The management host 30 can be composed of, for example, a CPU 301, a memory 302, a local disk 303, and a LAN interface 304. These components 301 through 304 are connected via a bus 305.

A plurality of programs are stored in the memory 302. The application management unit 310 and the storage management unit 320 are realized by the CPU 301 reading and executing these programs. The file management table 330 can be stored on the local disk 303.

Figure 3:
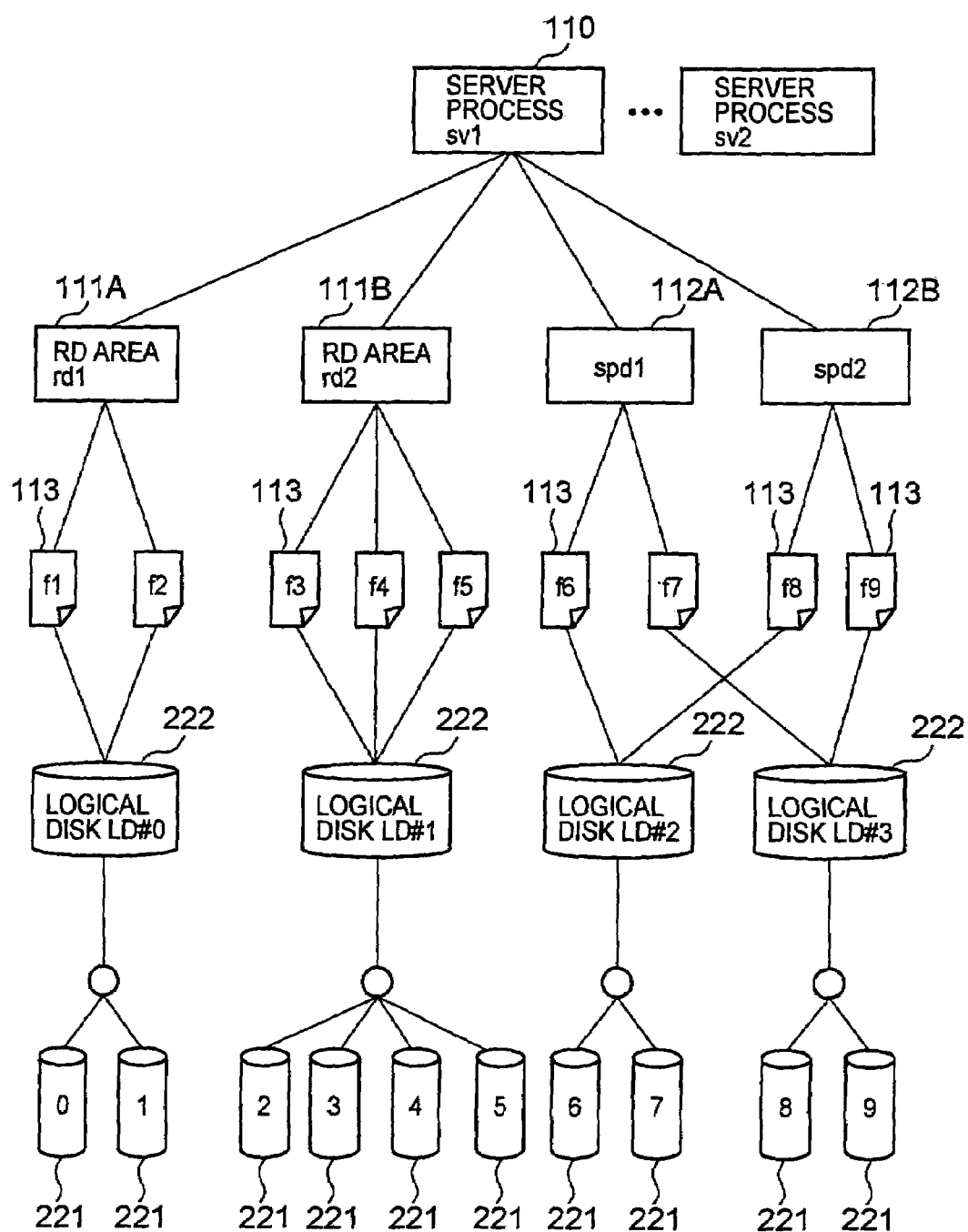
FIG. 3 is a descriptive diagram showing the data structure of the storage system.

FIG. 3 is a descriptive diagram showing schematically the data structure of the storage system. The case in which the application 110 is a database management program is used as an example. The application 110 can execute one or a plurality of server processes.

A single server process can use a plurality of types of files 111A, 111B, 112A, and 112B. The RD areas 111A and 111B are logical areas storing a table, and are composed of a plurality of files. The RD are as a real so referred to as 'table spaces' and 'table areas'. A synchronization point dump (hereafter referred to as an 'spd') 112A and 112B is management information necessary for fault recovery, and is composed of synchronization point dump files (hereafter referred to as 'spd files' being a type of system file.

The server process acquires a synchronization point at, for example, regular intervals. When the synchronization point is acquired, write access is simultaneously issued for all RD areas 111A and 111B under control of the server process, and for one spd 112A (or 112B).

Each RD area 111A and 111B, and each spd 112A and 112B can be composed of a plurality of files 113. These files 113 are stored on the prescribed logical disks (logical volumes) 222. Logical volumes are referred to as 'logical disks 222' in the description below.

As described previously, the volumes 222 exist logically in the physical storage area of the disk drive 221. The file 113 data stored in the volume 222 is stored in the prescribed address on the prescribed disk drive 221 comprising the volume 222.

When a storage structure is formed based on a RAID composed of a plurality of disk drives 221, the disk controller 210 induces storage of the file 113 data on the disk drive 221 in accordance with the RAID level. For example, with RAID1, the file 113 data is stored on each of the disk drives 221. With RAID3 through RAID5, the file 113 data is divided into the prescribed sizes and stored distributed over a plurality of disk drives 221. Furthermore, parity is computed for the divided data, and this computed parity is stored on the prescribed disk drive 221 or disk drives 221. RAID control described above is conducted by the disk controller 210.

As shown in FIG. 3, the spd files 113 of the RD areas 111A and 111B are stored on physically different disk drives 221 from the spd files 113 of 112A and 112B. Furthermore, the duplicated spd files f6 and f7, and f8 and f9 are stored on physically different disk drives 221.

FIG. 4 is a descriptive diagram showing an example of the configuration of the disk management table 323. The disk management table 323 can have the same configuration as the disk management table 211 held by the storage apparatus 20.

The disk management table 323 can be configured by associating for example, logical disk numbers, sizes, RAID configurations, statuses, physical disk numbers, and path information. The logical disk number is information for identifying each logical disk 222. In the present embodiment, each logical disk 222 can be identified uniquely within the storage apparatus 20 with a logical disk number. Size indicates the storage capacity of a logical disk 222 (volume size). RAID configuration indicates the RAID level of a logical disk 222.

Status indicates the current status of a logical disk 222. Status type can be, for example, 'in use', 'unused', and 'fault', and the like. The 'in use' status indicates that the logical disk 222 is currently used by an application 110. The 'unused' status indicates that the logical disk 222 is not currently used by any application 110 (not mounted).

The physical disk number is information for identifying a disk drive 221 comprising the logical disk 222. Each disk drive 221 is uniquely identified within the storage apparatus 20 by a physical disk number. Path information is information for discriminating between access paths to the logical disk 222. Port numbers discriminating between ports 204 can be used as path information.

FIG. 5 is a descriptive diagram showing a configuration example of the file management table 330. The file management table 330 manages which file in the storage system is used by which application 110, and where each file is stored, from a single point.

The file management table 330 can be configured by associating, for example, file names, file types, server process IDs, RD area IDs, file group IDs, logical disk numbers, and file sizes. File names are the names of files. File types indicate the type of the file. In the present embodiment, the two file types 'DB' and 'spd' are used as examples. The files comprising the RD areas 111A and 111B are classified as type 'DB'. The files comprising the spds 112A and 112B are classified as type 'spd'.

The server process ID is information for discriminating between server processes. Each server process is uniquely identified within the storage system by a server process ID. The RD area ID is information for uniquely identifying each RD area existing within the storage system. The RD area ID is set only for files comprising the RD area, and is not set for other files ('spd' type files) not belonging to the RD area. The file group ID is information for uniquely identifying duplicated file groups within the storage system. In the present embodiment, an example is shown in which only files belonging to spd files are duplicated. Thus, the file group ID is set only for files belonging to spd files, and is not set for other files not belonging to spd files ('DB' type files).

As described above, the logical disk number is information for uniquely identifying the logical disk 222, and can therefore identify each file stored on the logical disk 222. File size indicates the size of a file. In the present specification, a logical disk is also referred to as a 'device' in some cases.

FIG. 6 is a descriptive diagram showing a configuration example of the distribution rule table 313. The distribution rule table 313 manages the allocation policy for logical disks 222 derived based on the method of use of files by the application 110. The distribution rule table can therefore also be referred to as the 'distribution policy table'. The distribution rule table 313 can be configured by associating, for example, rule numbers, new file types, existing file types, compared items, and flags.

Rule numbers are information for discriminating between rules. New file types indicate file types stored on logical disks 222 scheduled to be newly allocated to the application 110. Existing file types indicate file types stored on logical disks 222 (logical disks 222 in use or for which a fault has occurred) already in existence. Compared items are items to be compared for new files and existing files.

Flags indicate the advantages and disadvantages of storing new files and existing files on the same disk drive 221. When a flag is set to 'OK', a new file can be stored on the same disk drive 221 as an existing file. In other words, a separate logical disk 222 composed of disk drives 221 on which existing files are stored can be allocated to the application 110. When the flag is set to 'NG', the new files and existing files cannot be stored on the same disk drive 221. New files and existing files are stored on separate disk drives 221.

Rule number r#1 regulates the distribution policy in the case in which new file and existing file types are each 'DB'. With this first rule, the RD area IDs for the new file and the existing file are compared, and when RD area IDs for both files match, storage of new and old files on the same disk drive 221 is permitted.

Rule number r#2 regulates the distribution policy in the case in which the new file type is 'DB', and the existing file type is 'spd'. With this second rule, the server process IDs for the new file and existing file are compared, and when the server process IDs match, storage of new and old files on the same disk drive 221 is prohibited. With the second rule, when a synchronization point is acquired, since write access is generated for DB files and spd files, I/O conflict is avoided, preventing deterioration in response performance.

Conversely to rule number r#2, rule number r#3 regulates the distribution policy in the case in which the new file type is 'spd', and the existing file type is 'DB'. The content of this third rule, is the same as for the second rule.

Rule number r#4 regulates the distribution policy in the case in which the new file type and the existing file type are 'spd'. With this fourth rule, the file group IDs for the new and old files are compared, and when the file group IDs for both files match, storage of new files and existing files on the same disk drive 221 is prohibited. This is due to the fact that, while spd files are duplicated, storage of duplicated spd files on the same disk drive 221 is undesirable for reasons of fault tolerance.

FIG. 7 is a descriptive diagram showing a configuration example of the volume management table volume management table 130. The volume management table 130 manages information for use of the logical disk 222 by the application 110. The volume management table 130 can be configured by associating, for example, device file names, logical disk numbers, and interface numbers.

Device file names indicate file names for accepting access requests from applications 110. Logical disk numbers indicate logical disk 222 numbers related the device file name. Interface numbers are information discriminating between interfaces for connecting the operations host 10 to the storage apparatus 20, and, for example, use information identifying HBAs 105.

Figure 8:
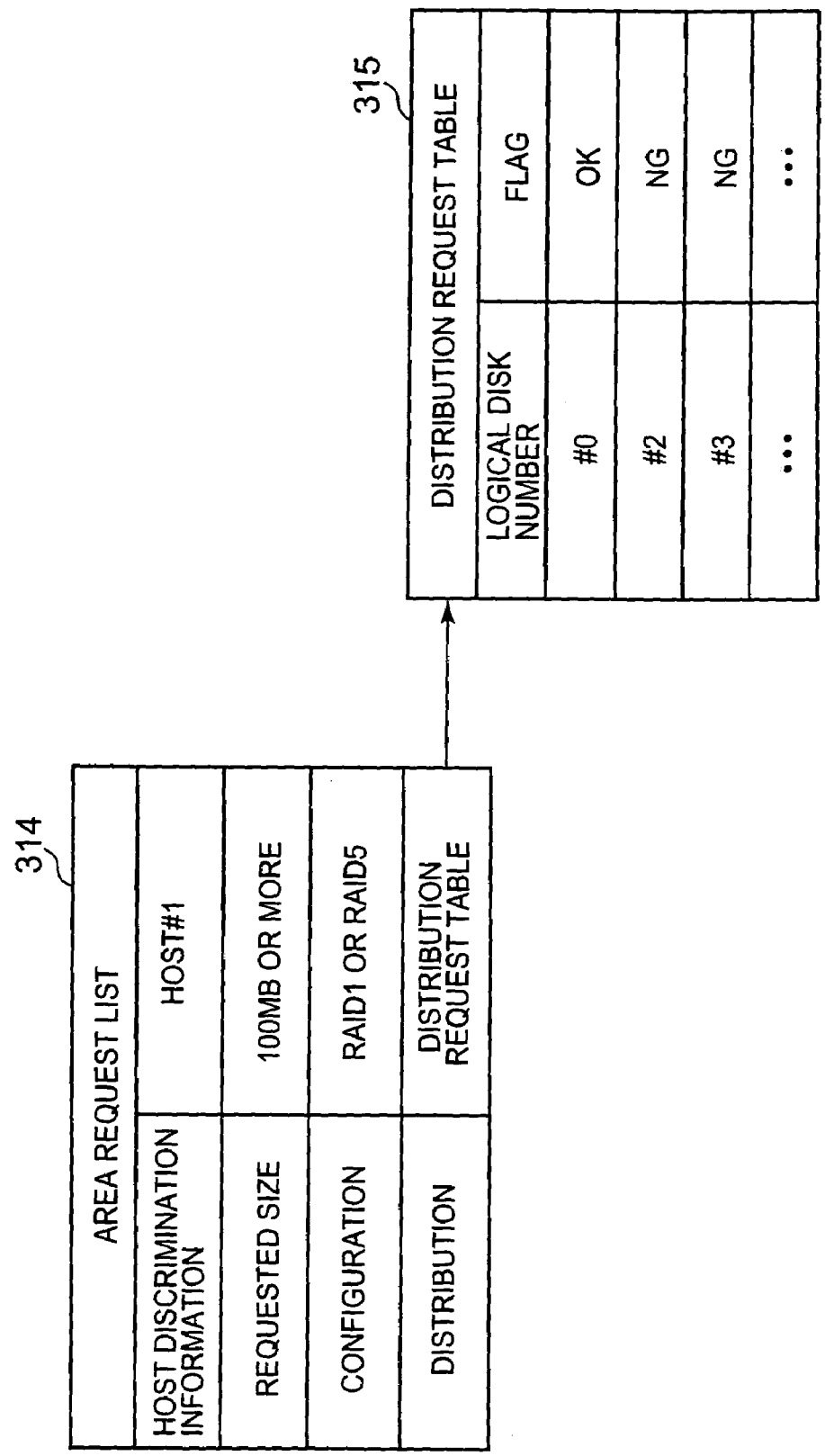
FIG. 8 is a descriptive diagram showing the configuration of the area request list and the distribution request table.

FIG. 8 is a descriptive diagram showing a configuration example of the area request list 314 created with the application management unit 310. The area request list 314 regulates conditions for selecting logical disks 222 to be allocated to the application 110. The area request list 314 can also be referred to as 'selection conditions information'. The storage management unit 320 selects unused logical disks 222 satisfying the conditions regulated by the area request list 314.

The area request list 314 can be configured by associating, for example, host discrimination information, requested size, RAID configuration, and distribution.

Host discrimination information is information for discriminating between operations hosts 10 desiring allocation of logical disks 222. Operations hosts 10 are uniquely identified within the storage system by host discrimination information.

Requested size indicates the required size for the logical disk 222. RAID configuration is information indicating the required RAID configuration. Distribution is information regulating the physical distribution conditions (location conditions) of the logical disk 222.

A plurality of types of configurations, for example, 'RAID1 or RAID5' and the like, can be set in the RAID configuration. The type of the disk drive 221 (FC disk, SATA disk and the like) can also be included in the area request list 314 items as in the embodiment described below.

Here, distribution details can be indicated with the distribution request table 315. As described below, the distribution request table 315 is created with the distribution rule table 313 and the file management table 330. The distribution request table 315 indicates the advantages and disadvantages of selection of each logical disk 222 within the storage system. The distribution request table 315 can be configured by associating, for example, logical disk numbers and flags.

A flag set to 'OK' implies that a separate unused logical disk 222 on a disk drive 221 comprising the logical disk 222 may be selected. A flag set to 'NG' implies that the unused logical disk 222 cannot be selected even when an unused logical disk 222 exists in a disk drive 221 comprising the logical disk 222. In other words, when a flag is set to 'NG', a separate disk drive 221 on the unused logical disk 222 and completely separate from the disk drive 221 related to the logical disk 222 is selected.

Figure 9:
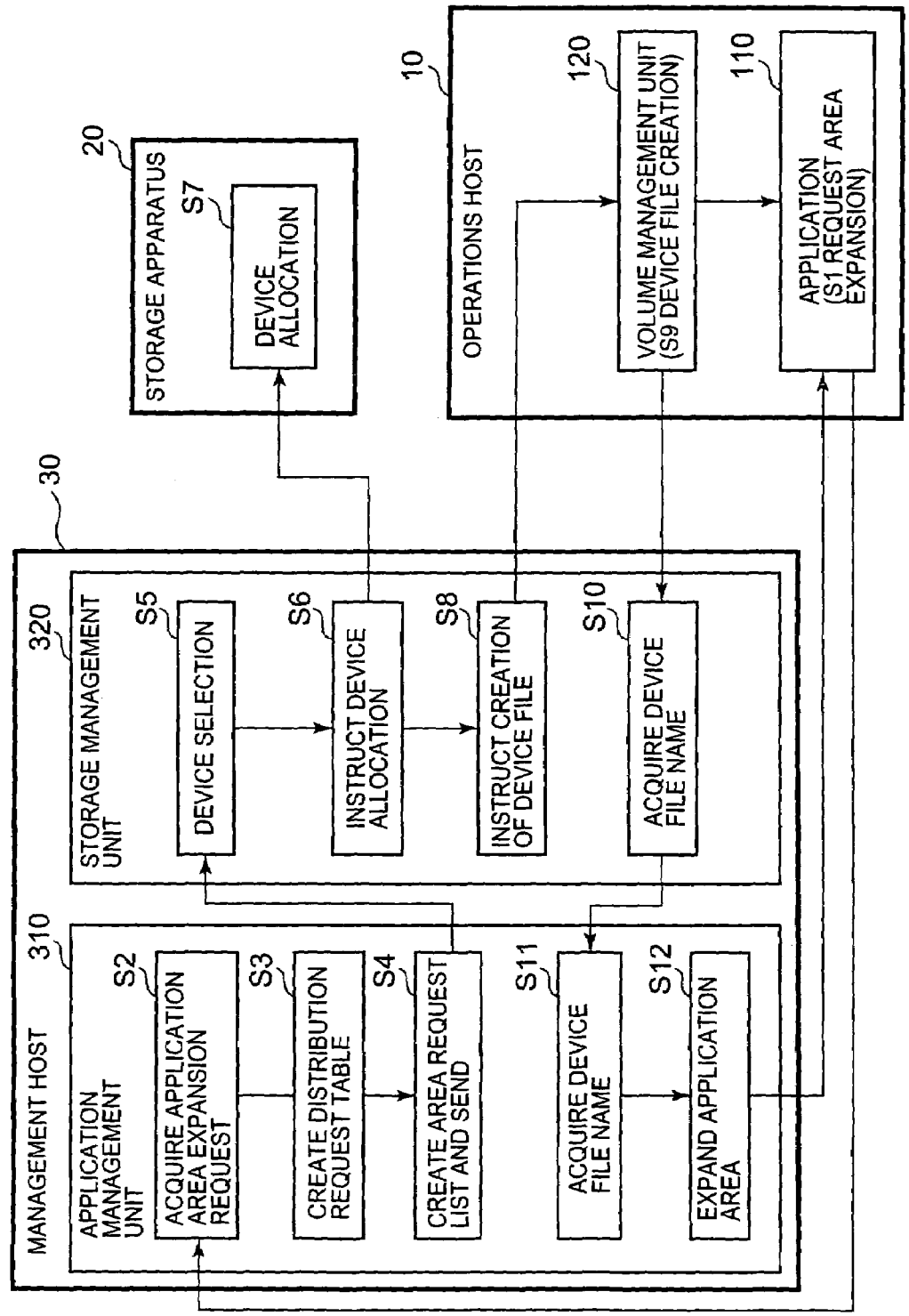
FIG. 9 is a flowchart showing an outline of processing for suitably allocating storage areas within the storage system.

FIG. 9 is a flowchart showing an outline of the allocation method for the logical disk 222. The application 110 requests the application management unit 310 of the management host 30 for expansion of the application area (S1). Here, issue of a request from the application 110 is described, however, as will also be apparent from the following embodiment, the application area expansion request can be issued manually or automatically. Furthermore, the application area expansion request can also be input directly to the management host 30 from, for example, a management terminal (not shown in figures).

The basic conditions for extracting the required logical disk 222, and information related to the method of use of the logical disk 222, are included in the application area expansion request. Basic information for extracting the logical disk 222 can be, for example, host discrimination information, requested size, and RAID configuration. In other words, of the conditions included in the area request list 314, conditions other than 'distribution' apply. Information related to the method of use of the logical disk 222 can be, for example, information for identifying the application 110 requiring the logical disk 222 (server process ID), and the type of file scheduled to be stored on the logical disk 222.

When the application management unit 310 receives the application area expansion request (S2), the application management unit 310 creates the distribution request table 315 (S3) based on the distribution rule table 313 and the file management table 330. The application management unit 310 creates the area request list 314 from the other conditions included in the application area expansion request and the distribution request table 315, and sends this list 314 to the storage management unit 320 (S4).

When the storage management unit 320 receives the area request list 314, the storage management unit 320 selects a logical disk 222 satisfying all conditions shown in the list 314 (S5). The storage management unit 320 instructs the storage apparatus 20 to allocate a logical disk 222 so that the application 110 requiring expansion of the application area can use the selected logical disk 222 (S6).

When the storage apparatus 20 receives the device allocation instruction from the storage management unit 320, settings are made so that the specified logical disk 222 can be used from the prescribed operations host 10 (S7).

The storage management unit 320 issues an instruction to the storage apparatus 20, while on the other hand, instructs the operations host 10 requiring application area expansion to create the device file (S8).

Based on the instruction from the storage management unit 320, the operations host 10 creates the device file for using the selected logical disk 222 (S9). The operations host 10 notifies the storage management unit 320 of the device file name.

When the storage management unit 320 receives the device file name from the operations host 10 (S10), the storage management unit 320 notifies the application management unit 310 of the received device file name (S11). When the application management unit 310 receives the device file name for using the newly allocated logical disk 222 from the storage management unit 320 (S11), the application area is expanded using this device file name (S12), and processing is terminated.

Figure 10:
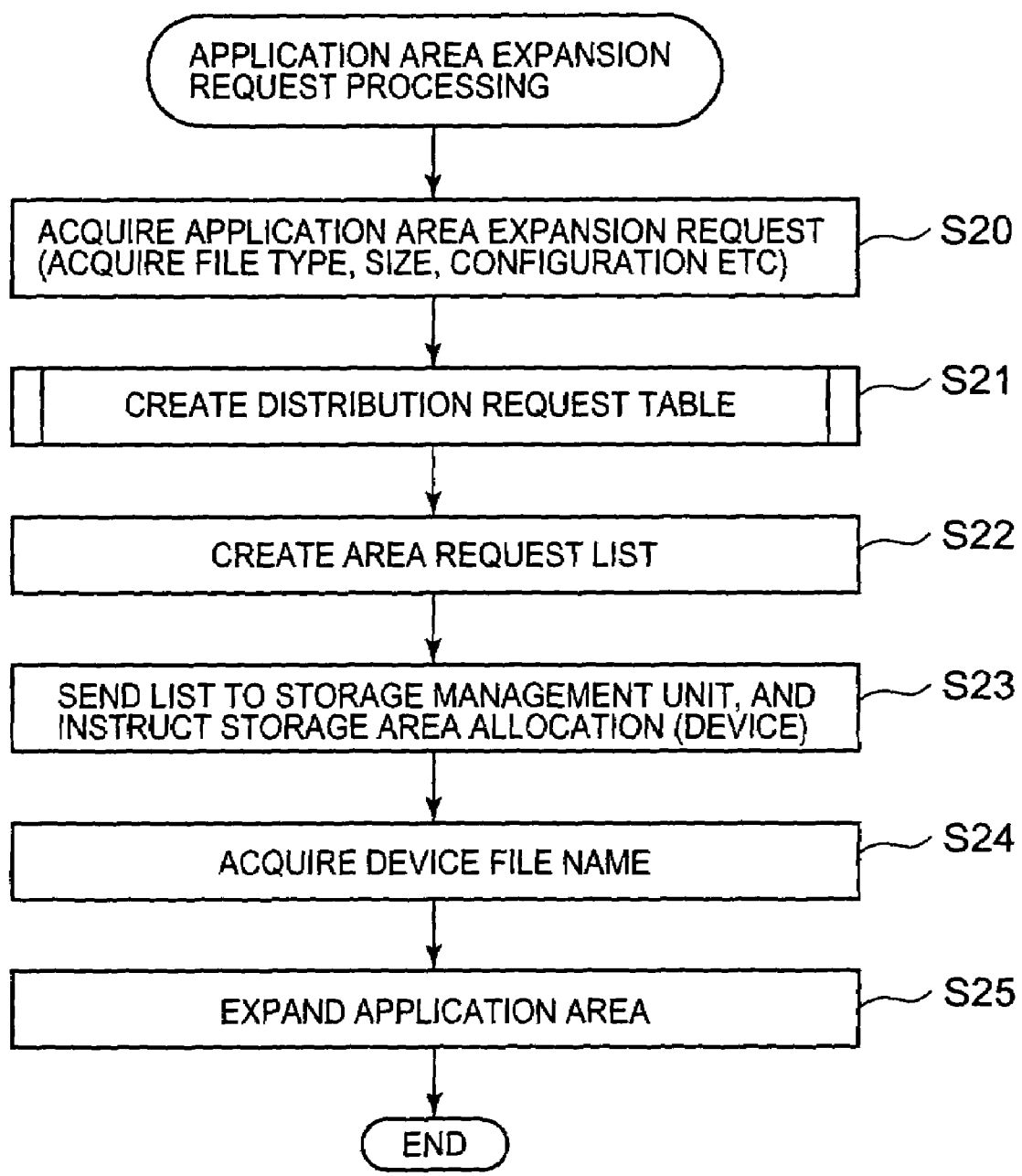
FIG. 10 is a flowchart showing application area expansion processing.

The above is an outline of overall operation. Details of each processing are described below. FIG. 10 is a flowchart showing the application area expansion processing executed with the application management unit 310. Flowcharts described below are similar. Each flowchart shows an outline of the respective processing, and as such differs from actual program configuration.

This processing is started when the application management unit 310 receives an application area expansion request from the operations host 10 or the management terminal (S20). The application management unit 310 induces creation of the distribution request table 315 with distribution request table creation processing 312 (S21). Details of distribution request table creation processing 312 are described further below.

When the distribution request table 315 is created, the application management unit 310 creates the area request list 314 from this distribution request table 315 and the other conditions indicated in the application expansion request (S22).

The application management unit 310 sends the area request list 314 to the storage management unit 320, and instructs allocation of the logical disk 222 (S23). When the device file name being the result of area expansion with the storage management unit 320 is then received from the storage management unit 320 (S24), the application management unit 310 uses this device file name to expand the application area, and terminates the present processing (S25).

Figure 11:
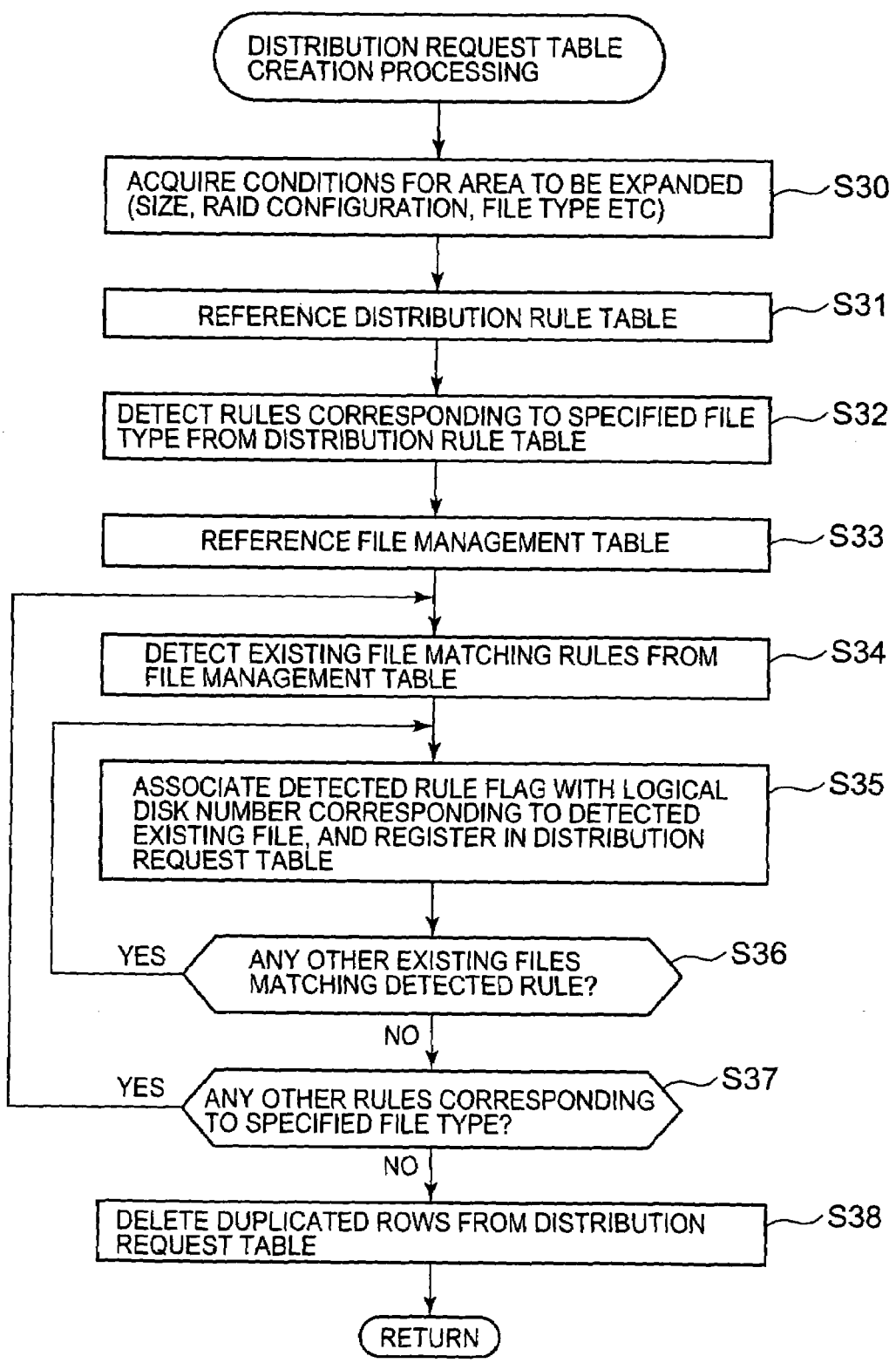
FIG. 11 is a flowchart showing distribution request table creation processing.

FIG. 11 is a flowchart showing distribution request table creation processing. This processing corresponds to S21 in FIG. 10. The application management unit 310 acquires information such as the size and file type and the like included in the application area expansion request (S30), and references the distribution rule table 313 (S31).

Based on the file type included in the application area expansion request, the application management unit 310 searches the distribution rule table 313 to detect a corresponding rule (S32). In other words, the file type included in the application area expansion request is the file type stored on the logical disk 222 to be newly allocated, and corresponds to 'new file type' in the distribution rule table 313. The application management unit 310 then detects a rule corresponding to this new file type. For example, when the new file type is 'DB', the first rule and second rule regulated in the distribution rule table 313 are detected. If the new file type is 'spd', the third rule and fourth rule are detected.

Next, the application management unit 310 references the file management table 330 (S33), and detects an existing file matching the rule detected in S32 (S34). The application management unit 310 detects the logical disk number stored in the detected existing file, associates a flag with this logical disk number, and registers this association in the distribution request table 315 (S35). In other words, the application management unit 310 associates the flag for the rule used in searching the file management table 330 with the logical disk number corresponding to this rule, and registers this association in the distribution request table 315.

The application management unit 310 evaluates whether or not other existing files corresponding to that rule exist in the file management table 330 (S36), and executes step S35 until all existing files matching this rule are detected. When flags are associated with all logical disk numbers matching this rule and registered in the distribution request table 315 (NO in S36), the application management unit 310 evaluates whether or not other rules corresponding to the new file type related to the application expansion request exist (S37).

When other rules related to this new file type exist (YES in S37), the application management unit 310 repeats steps S34 through S36. When the file management table 330 is searched based on all rules, and the corresponding logical disk numbers and flags are registered in the distribution request table 315 (NO in S37), the application management unit 310 deletes duplicated rows from the distribution request table 315 (S38), thus completing the distribution request table 315.

The description below employs a practical example. For example, it is assumed that the file type requested by the application-area expansion request is 'DB', the RD area ID is 'rd1', and the server process ID is 'sv1'. In this case, since the new file type is 'DB', the first rule (r#1) and the second rule (r#2) are detected in the distribution rule table 313.

The application management unit 310 initially detects the file management table 330 based on the first rule. As previously described, according to the first rule, when the new file type and the existing file type are both 'DB', if the RD area ID of both the new and old files match, coexistence on the same disk drive 221 is permitted.

The application management unit 310 searches for existing files having a file type 'DB', and having an RD area ID matching the RD area ID of new files related to the application area expansion request (S34). In the example shown in FIG. 5, two files 'f1' and 'f2' files have the same RD area ID as the new file RD area ID 'rd1'. The existing file 'f1' is found first.

The application management unit 310 detects the logical disk number being the storage destination of the existing file 'f1'. In this case, the logical disk number is '0'. The application management unit 310 associates the first rule flag 'OK' with the logical disk number '0', and registers this association in the first row of the distribution request table 315 (S35).

Next (YES in S36), the application management unit 310 finds the existing file 'f2' matching the first rule from the file management table 330 (S34). As described above, the application management unit 310 associates the first rule flag 'OK' with the logical disk number '0' stored in the existing file 'f2', and registers this association in the distribution request table 315 (S35). As a result, two rows having the same content are registered in the distribution request table 315, however, duplicated rows are eventually removed (S38).

Next, the application management unit 310 conducts the afore-mentioned processing for the second rule corresponding to the new file type 'DB' (YES in S37). In the second rule, when the spd file and the DB file have the same server process ID, storage of both files on the same disk drive 221 is prohibited. The second rule is not applied when the server process ID differs. This is due to the fact that I/O conflict does not occur when the spd file is acquired if the server process IDs differ.

Files corresponding to the second rule are files having a file type 'spd' a server process ID 'sv1'. In the example shown in FIG. 5, the four files 'f6', 'f7', 'f8', and 'f9' correspond to this second rule.

The application management unit 310 associates the second rule flag 'NG' with the logical disk number '2' corresponding to the existing file 'f6', and registers the association in the table 315. The application management unit 310 then associates the second rule flag 'NG' with the logical disk number '3' corresponding to the existing file 'f7', and registers the association in the table 315. Similarly, the application management unit 310 associates the flag 'NG' with the logical disk number '2' corresponding to the existing file 'f8', and registers the association in the table 315, and finally, associates the flag 'NG' with the logical disk number '3' corresponding to the existing file 'f9', and registers the association in the table 315. As a result, registration of the rows for the logical disk numbers '2' and '3' are duplicated in the distribution request table 315, however, duplicated rows are deleted.

As described above, based on the preset distribution rules, the application management unit 310 searches the file management table 330 to detect logical disks 222 corresponding to the distribution rules, and sets the prescribed flag.

Figure 12:
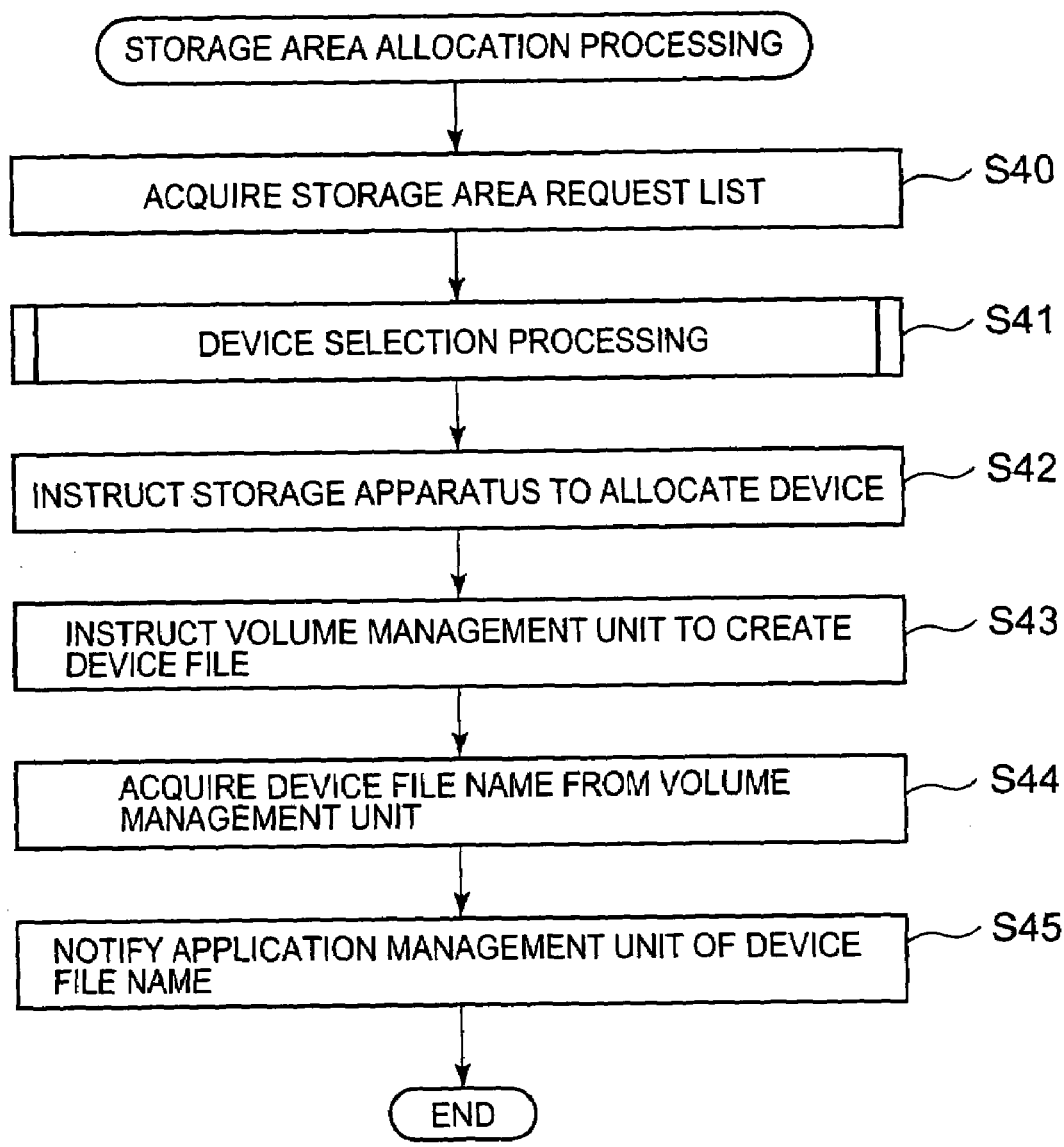
FIG. 12 is a flowchart showing storage area allocation processing.

FIG. 12 is a flowchart showing storage area allocation processing executed by the storage management unit 320. This processing is started when the area request list 314 is received from the application management unit 310 (S40).

Based on the area request list 314 and the disk management table 323, the storage management unit 320 selects a logical disk 222 which can be allocated (S41). This device selection processing is described in further detail below.

The storage management unit 320 notifies the storage apparatus 20 of the selected logical disk number, and requests allocation of a device (S42). Furthermore, the storage management unit 320 notifies the volume management unit 120 of the operations host 10 of the selected logical disk number, and instructs creation of a device file (S43).

When the device file is created by the volume management unit 120, the storage management unit 320 acquires the device file name (S44), and notifies the application management unit 310 of this device name (S45).

Figure 13:
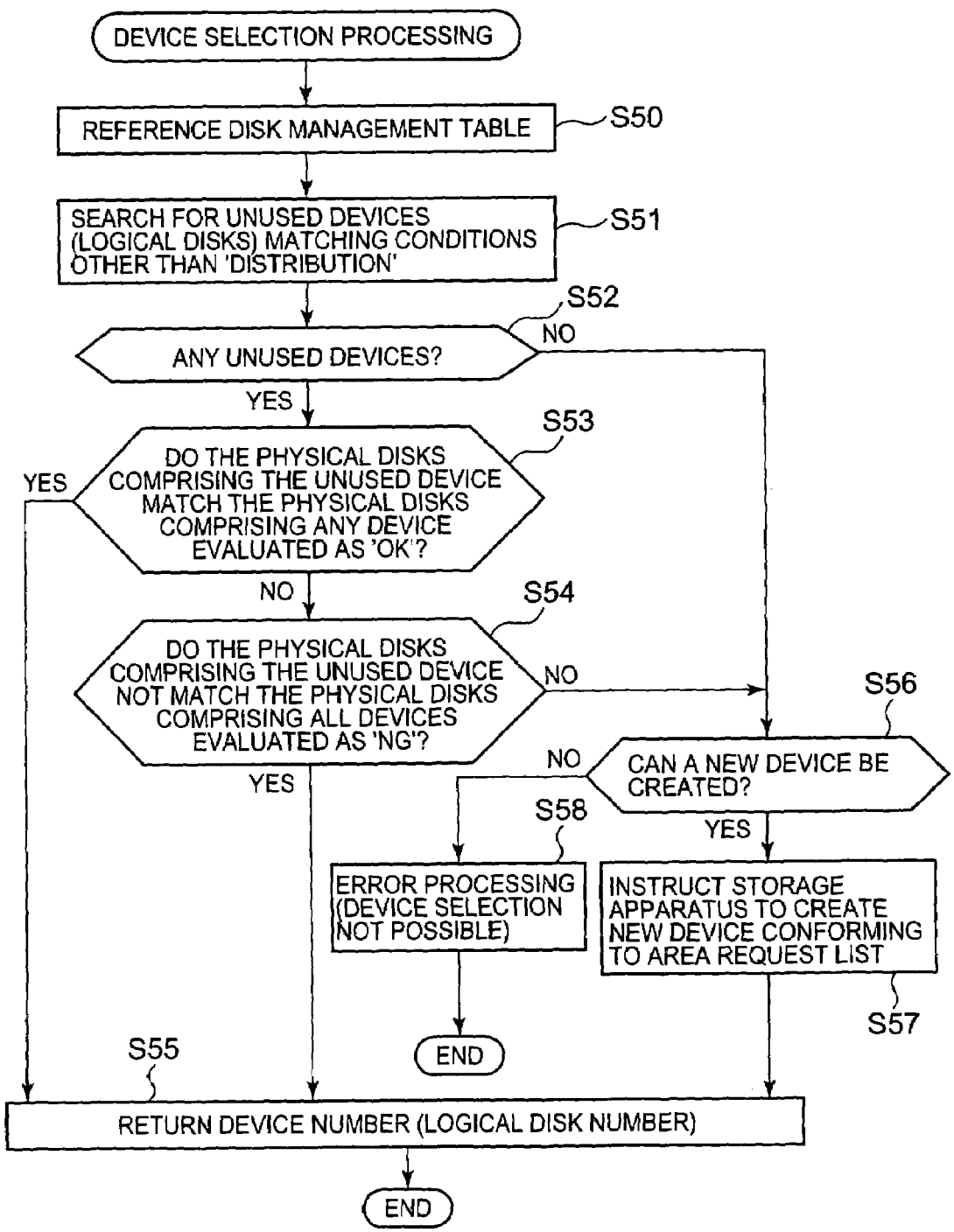
FIG. 13 is a flowchart showing device selection processing.

FIG. 13 is a flowchart showing device selection processing 322 executed by the storage management unit 320. This processing corresponds to S41 in FIG. 12.

The storage management unit 320 references the disk management table 323 (S50), and searches for unused logical disks 222 matching the conditions other than 'distribution' in the area request list 314 (S51). In other words, the storage management unit 320 extracts all logical disks 222 matching the basic conditions (requested size and RAID configuration) in the area request list 314, and which are unused. The area request list 314 also includes 'host discrimination information', however, since this information in unrelated to selection of logical disks 222, it is not used in this processing.

When an unused logical disk 222 with the requested volume size and RAID configuration exists (YES in S52), the storage management unit 320 evaluates whether or not the physical disk comprising the unused logical disk 222 (in other words, the disk drive 221) matches the physical disk comprising any logical disk for which the 'OK' flag is set in the distribution request table 315 (S53).

As described previously, the numbers of logical disks which can coexist on the same disk drive 221, and the numbers of logical disks which can not coexist on the same disk drive 221, are shown for new files and existing files in the distribution request table 315. The storage management unit 320 detects the numbers (physical disk numbers) of the disk drives 221 comprising the unused logical disk 222 from the disk management table 323. Furthermore, the storage management unit 320 detects physical disk numbers of disk drives 221 comprising logical disks 222 for which the 'OK' flag is set in the distribution request table 315 from the disk management table 323.

The storage management unit 320 compares physical disk numbers related to unused logical disks 222 and physical disk numbers related to unused logical disks 222 for which the 'OK' flag is set. When physical disk numbers related to unused logical disks 222 match a physical disk number related to any unused logical disk 222 for which the 'OK' flag is set (YES in S53), the storage management unit 320 selects that unused logical disk 222 and returns the physical disk number in the flowchart in FIG. 12 (S55).

On the other hand, when the physical disk number related to the unused logical disk 222 does not match any physical disk number related to unused logical disks 222 for which the 'OK' flag is set (NO in S53), the storage management unit 320 conducts the following inspection (S54).

The storage management unit 320 evaluates whether or not the physical disk number related to the unused logical disk 222 does not match any of the physical disk numbers related to unused logical disks 222 for which the 'NG' flag is set in the distribution request table 315 (S54).

When the physical disk numbers related to unused logical disks 222 do not match any of the physical disk numbers related to the 'NG' flag (YES in S54), the storage management unit 320 selects the unused logical disk 222 and returns the logical disk number (S55). This is due to the fact that the unused logical disk 222 includes no disk drives 221 prohibited from coexistence by the distribution request table 315, and no problems with performance or fault tolerance occur even if the unused logical disk 222 is selected.

Thus, two types of inspection (S53, S54) are conducted for unused logical disks 222 satisfying the basic conditions. The first inspection is a coexistence possible inspection (S53), and the second inspection is a coexistence impossible inspection (S54). When a plurality of unused logical disks 222 is detected, for example, if an unused logical disk 222 passing the inspection in S53 exists, that logical disk 222 is selected. When no unused logical disks 222 pass the inspection in S53, unused logical disks 222 passing the inspection in S54 are selected. Processing is not limited to this, and either of the inspections S53 and S54 may be conducted in sequence beginning from the lowest unused logical disk number, and logical disks passing both inspections may also be selected.

Incidentally, when no unused logical disk 222 exists (NO in S52), the storage management unit 320 evaluates whether or not a new logical disk 222 can be created (S56). Furthermore, the storage management unit 320 evaluates whether or not a new logical disk 222 can be created (S56) even when the logical disk number related to the unused logical disk 222 matches a logical disk number related to a logical disk 222 for which the 'NG' flag has been set (NO in S54).

For example, when a few or more disk drives 221 for which no logical disks 222 are set match the requested size and RAID configuration, the storage management unit 320 determines that a new logical disk 222 can be created (YES in S56). The storage management unit 320 instructs the storage apparatus 20 to create a logical disk 222 having the size and RAID configuration specified in the area request list 314 (S57).

On the other hand, for example, when the necessary disk drives 221 do not exist, and a new logical disk 222 cannot be created (NO in S56), the storage management unit 320 conducts error processing (S58). In error processing, for example, the application management unit 310 and the like are notified to the effect that device selection is not possible. The application management unit 310 sends this error notification to, for example, the operations host 10 or the management terminal.

Since the present embodiment is configured in this manner, the following benefits are demonstrated. The configuration in the present embodiment is such that a logical disk 222 having a suitable physical location relationship in accordance with the application is allocated to the application 110 requesting expansion of the storage area. In the present embodiment, therefore, as with DB files and spd files, for example, when accessing one file, access to the other file generated simultaneously, and a plurality of files having a relationship in which I/O conflict occurs can be stored on separate disk drives 221. Thus, reduction in response performance can be prevented. Furthermore, in the present embodiment, as with duplicated spd files, for example, a plurality of files having the same content can be stored on separate disk drives 221. Thus, fault tolerance can be improved.

In the present embodiment, configuration is such that, when an application area expansion request including basic conditions such as the volume size and RAID configuration is issued, the management host 30 considers the physical location relationship of a plurality of files, selects a suitable logical disk 222, and allocates this selected logical disk 222 to the application 110. Users and the like can therefore, for example, request expansion of the application area without being aware in any way of the location relationship at the physical disk level, and ease of operation of the storage system can be improved.

In the present embodiment, the content of the distribution rule table 313 can be declared and set by the creator or user of the application 110. The creator and the like of the application 110 can therefore set a device allocation policy suited to the application 110. Thus, for example, when insufficient application 110 area is automatically detected, the logical disk 222 can be allocated autonomously in consideration of all factors including the physical location relationship.

Second Embodiment

Figure 15:
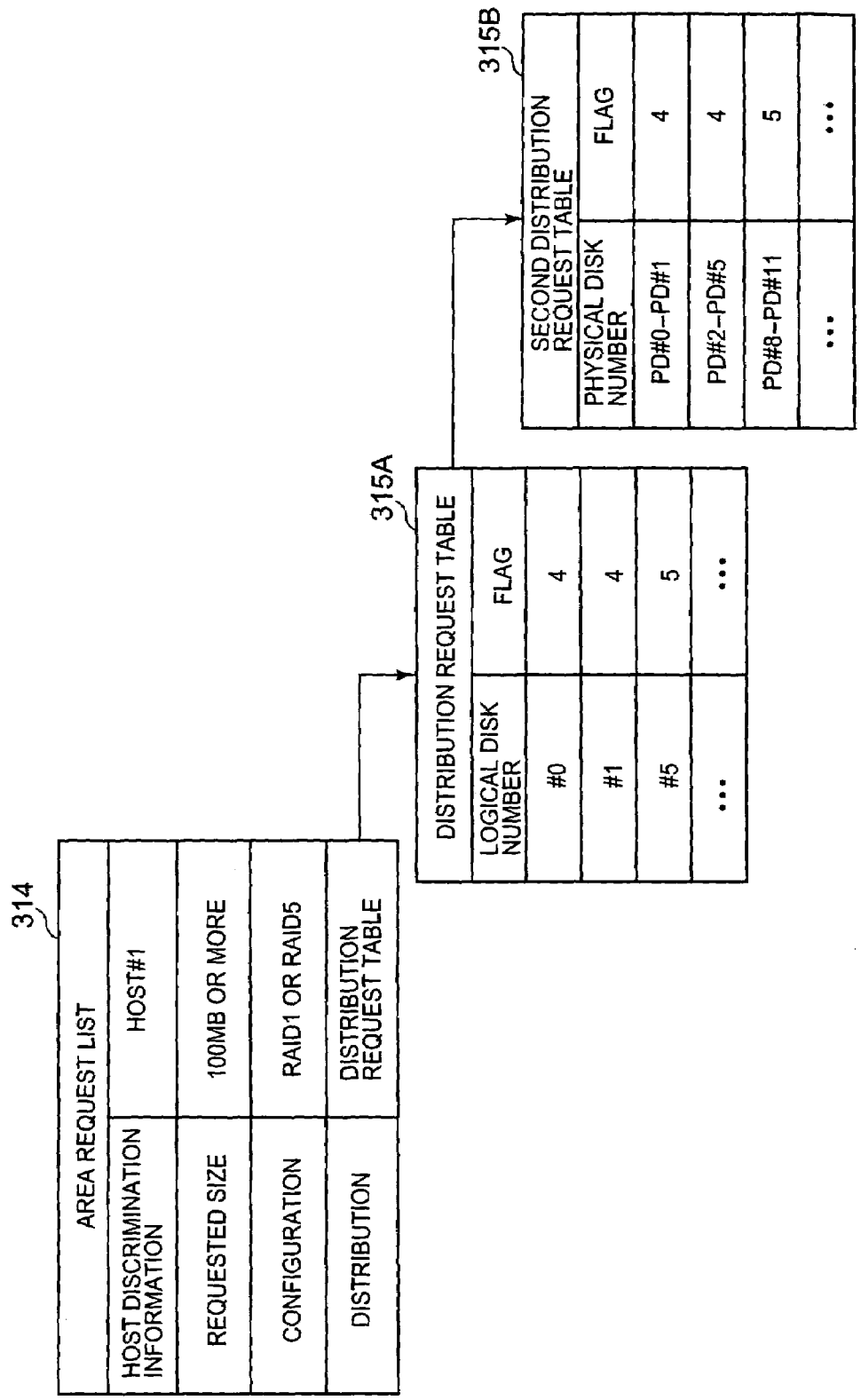
FIG. 15 is a descriptive diagram showing the configuration of the area request list and the plurality of distribution request tables.
Figure 16:
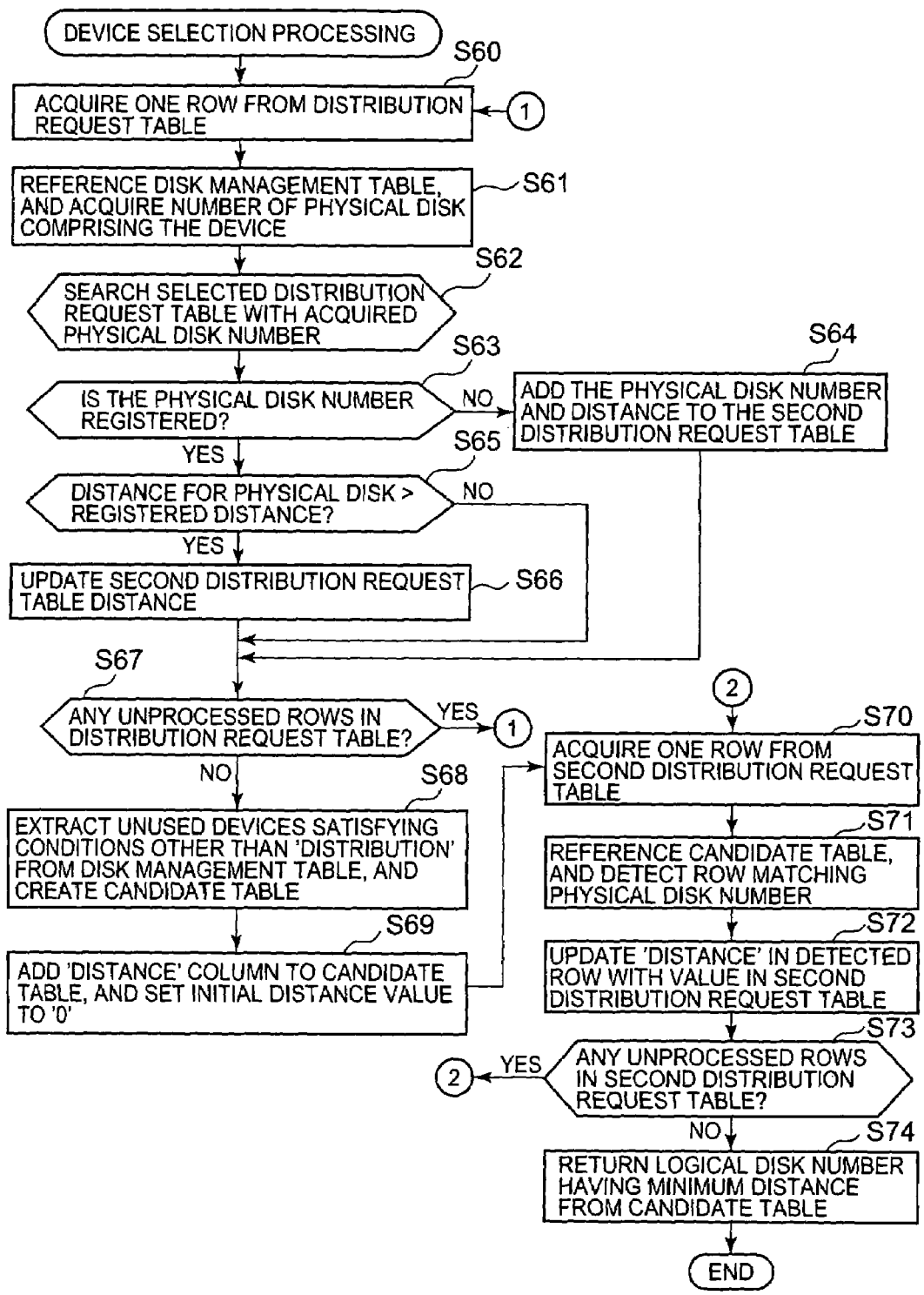
FIG. 16 is a flowchart showing device selection processing.

The second embodiment is described based on FIG. 14 through FIG. 16. In the present embodiment, the possibility of selection of each logical disk 222 is weighted and evaluated. Each of the embodiments described below is a variation of the first embodiment described above.

FIG. 14 is a descriptive diagram showing the configuration of the distribution rule table 313A used in the present embodiment. This distribution rule table 313 has the same configuration as the distribution rule table 313 described in the previous embodiment except for flag content.

In the distribution rule table 313A, flags are set to multiple values, and the physical location relationship between the logical disks 222 (physical location relationship between a plurality of files) is weighted. For example, the value '-1' is set in the first rule (r#1) flag, and the value '4' is set in the second rule (r#2) flag and third rule (r#3) flag. The value '5' is set in the fourth rule (r#4) flag.

The value '-1' indicates that an unused logical disk 222 existing on the disk drive 221 comprising the logical disk 222 can be selected. As the flag value increases in the positive direction, the possibility of selection of the unused logical disk 222 existing on the disk drive 221 comprising the logical disk 222 decreases. In other words, the relative strength of the request to distribute new files and existing files on separate disk drives 221 is indicated by the flag value.

The disk drive 221 related to the logical disk 222 for which a flag value of '4', is set has a relatively higher possibility of being selected than a disk drive 221 related to the logical disk 222 for which a flag value of '5' is set.

In the present embodiment, negative values and multiple positive values, for example, '-1', '1', '2', '3', '4', and '5' and the like are used. '0' is not used. As described below, '0' is used as the initial distance value. However, flag values are not limited to the above. Multiple negative values, and multiple or single positive values may be employed, for example, '-3', '-2', '-1', '1', '2', and '3' and the like, and '0' may be used. Thus, since the flags in the present embodiment indicate the concept of distance from the logical disk 222 storing existing files, the flag values in the following description are referred to as 'distance' in some cases.

FIG. 15 is a descriptive diagram showing configuration examples of the distribution request table 315A and distribution request table 315B used in the present embodiment. The content of the 'distribution' item in the area request list 314 is regulated in the distribution request table 315A. This distribution request table 315A indicates the 'degree of compatibility of the physical location relationship' of the logical disks 222 already in use, and practical details are shown in the second distribution request table 315B. The second distribution request table 315B is a conversion to physical disk numbers of the logical disk numbers registered in the first distribution request table 315A. The second distribution request table 315B can also be referred to as a 'physical distribution request table'.

FIG. 16 is a flowchart showing device selection processing according to the present embodiment. This processing is executed by the storage management unit 320. As described below, this processing includes a plurality of stages being the second distribution request table creation stage (S60 through S67), the candidate table creation stage (S68 through S73), and the device selection stage (S74).

The storage management unit 320 acquires one row of registered content from the distribution request table 315A (S60), references the disk management table 323, and acquires the physical disk corresponding to the logical disk number registered in that row (S61).

The storage management unit 320 evaluates whether or not the logical disk number is already registered (S63) by searching the second distribution request table 315B for the acquired logical disk number (S62). When the logical disk number is not yet registered in the second distribution request table 315B (NO in S63), the storage management unit 320 adds the logical disk number and the distance to the second distribution request table 315B (S64). Here, the distance associated with the logical disk number is a flag value set in the logical disk number corresponding to the physical disk number.

The storage management unit 320 then evaluates whether or not unprocessed rows remain in the distribution request table 315A (S67), and when unprocessed rows exist (YES in S67), the storage management unit 320 returns to step S60, acquires the next row from the distribution request table 315A, and converts the logical disk number on that row to a physical disk number (S61, S62). When this converted physical disk number is not registered in the second distribution request table 315B (NO in S63), the storage management unit 320 registers that physical disk number and the distance in the second distribution request table 315B (S64).

Thus, the second distribution request table 315B is created. When the physical disk number acquired in S61 is already registered in the second distribution request table 315B (YES in S63), the storage management unit 320 compares the magnitude of the newly acquired physical disk number distance and the already registered distance (S65). When the new distance is greater than the already registered distance (YES in S65), the storage management unit 320 updates the registered distance with the new distance (S66).

In other words, when a plurality of distances exist for the same physical disk number, the storage management unit 320 employs the greater distance. Thus, the possibility of selecting the disk drive 221 not to be selected can be controlled, and a suitable logical disk 222 can be allocated to the application 110 with greater reliability.

The second distribution request table 315B is complete when all rows in the distribution request table 315A have been processed (NO in S67). The storage management unit 320 references the disk management table 323, extracts an unused logical disk 222 satisfying the conditions other than the 'distribution' condition (size and RAID configuration), and creates the candidate table (S68). In this stage, unused logical disk numbers for which only basic conditions such as the size and RAID configuration match are listed in the candidate table.

Next, the storage management unit 320 adds the 'distance' column to the candidate table, and sets '0' as the initial distance value for each unused logical disk number (S69). The storage management unit 320 then acquires one row of data from the second distribution request table 315B (S70), and evaluates whether or not the logical disk number related to the physical disk number included in this row exists in the candidate table (S71). In other words, the storage management unit 320 references the disk management table 323 based on the unused logical disk numbers registered in the candidate table, and compares the physical disk number corresponding to the unused logical disk number with the physical disk number registered in the second distribution request table 315B.

The distance associated with the physical disk number is then set in the unused logical disk number related to the physical disk number registered in the second distribution request table 315B (S72). In other words, the initial distance value for the unused logical disk number is updated to a value other than '0'. The storage management unit 320 evaluates whether or not unused rows remain in the second distribution request table 315B (S73). While unused rows remain (YES in S73), the storage management unit 320 takes data one row at a time from the second distribution request table 315B, and updates the distance in the corresponding row in the candidate table.

Thus, when all rows in the second distribution request table 315B are processed (NO in S73), in other words, when the candidate table is complete, the storage management unit 320 selects the logical disk number for which the smallest distance is set from the unused logical disk numbers registered in the candidate table (S74). When a plurality of unused logical disk numbers having the smallest distance exist, for example, the number registered closest to the top of the table may be selected.

In the present embodiment configured in this manner, as well, the same benefits as in the afore-mentioned embodiment are demonstrated. Additionally, in the present embodiment, the strength of the request for distribution of files to separate disk drives 221 may be set with a multiple value flag. Furthermore, in the present embodiment, the strength of this request can be specified in terms of intuitively understandable 'distance'. Therefore, when, for example, the number of file types is greater than the number of disk drives 221, a more suitable logical disk 222 can be selected. Consider, for example, the case in which there are only three logical disks 222 composed of differing disk drives 221, and four file types for which it is desirable that storage be in physically different distributions. In this case, at least two files are stored on the same disk drive 221. In the present embodiment, files for which distance is small coexist on the same disk drive 221. Thus, even when there are no spare physical storage areas available, a plurality of types of files can coexist in a suitable storage area as much as possible.

Third Embodiment

The third embodiment is described based on FIG. 17 through FIG. 21. In the present embodiment, the management host 30 allocates a suitable logical disk 222 to an application 110 in a storage system having a plurality of storage apparatuses 20 and a plurality of operations hosts 10.

Figure 17:
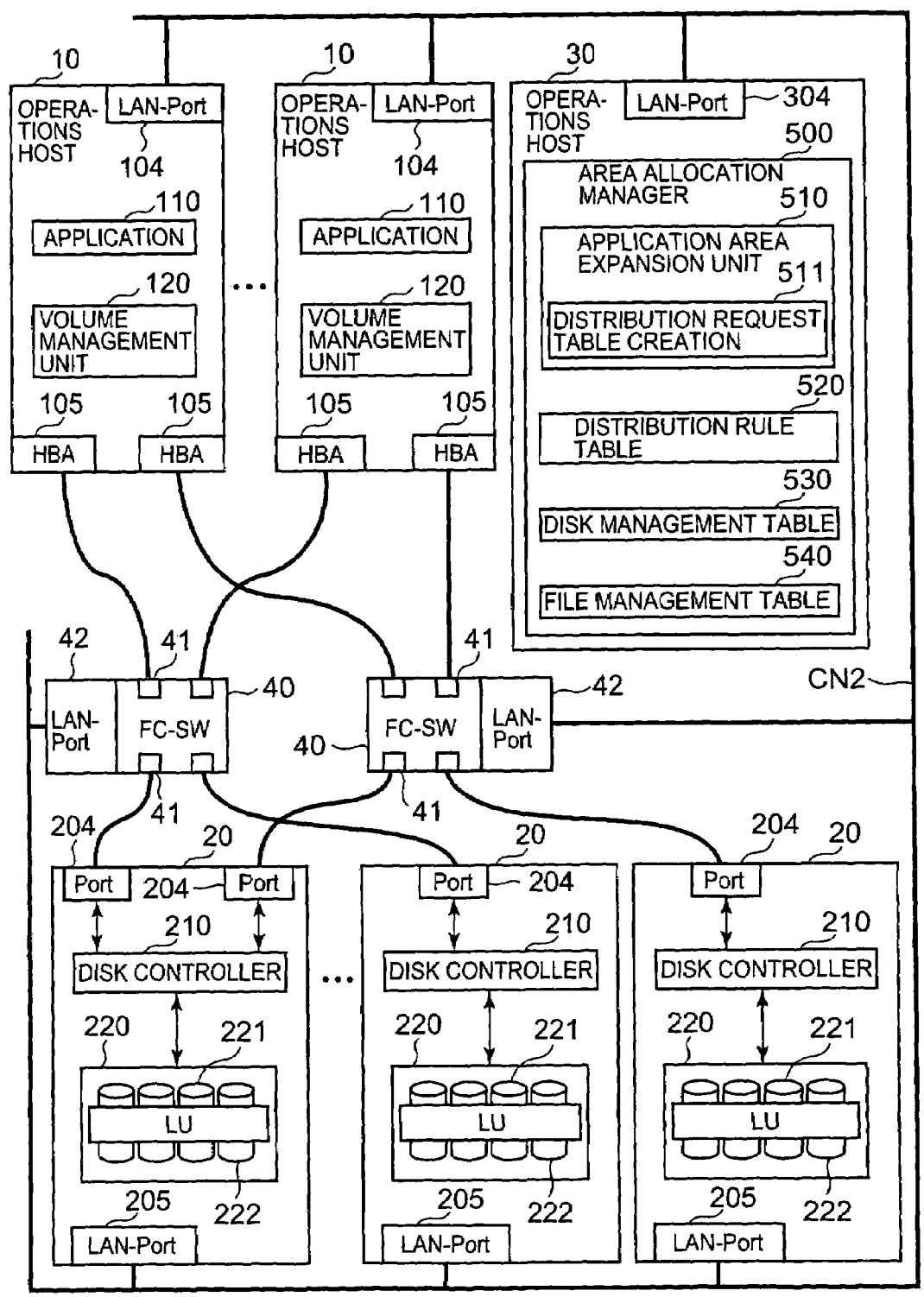
FIG. 17 is a block diagram showing the overall configuration of the storage system according to the third embodiment.

FIG. 17 is a block diagram showing the overall configuration of the storage system according to the present embodiment. This storage system has a plurality of operations hosts 10, a plurality of storage apparatuses 20, and a management host 30.

The configuration of each operations host 10 and each storage apparatus 20 is the same as described in the first embodiment. This description is therefore omitted. Each operations host 10 and each storage apparatus 20 are, for example, connected by a plurality of fiber channel switches 40. Each switch 40 has a plurality of ports 41. These switches 40 are each connected between from the LAN port 42 to the management host 30 via the communications network CN2.

The management host 30 has an area allocation manager (hereafter referred to as an 'allocation manager') 500. This allocation manager 500 realizes the functions of both the application management unit 310 and the storage management unit 320 described in the first embodiment. In place of a single allocation manager 500, a configuration may be used in which the functions are separated and linked.

The allocation manager 500 can be composed of, for example, an application area expansion unit 510, a distribution rule table 520, a disk management table 530, and a file management table 540. The application area expansion unit 510 includes a distribution request table creation process 511.

FIG. 18 is a descriptive diagram showing the configuration of the disk management table 530 used in the present embodiment. The disk management table 530 is configured by acquiring the disk management tables managed by each storage apparatus 20 with the prescribed timing. In other words, the disk management table 530 integrates the disk management tables managed individually by the storage apparatuses 20, and registers information related to all logical disks 222 existing in the storage system.

The disk management table 530 has the entire configuration of the disk management table 323 shown in FIG. 4. Additionally, the disk management table 530 of the present embodiment manages the apparatus numbers corresponding to each logical disk number, switch numbers (hereafter referred to as 'SW numbers'), and HBA numbers.

Apparatus numbers are discrimination information for uniquely identifying each storage apparatus 20 within the storage system. SW numbers are discrimination information for uniquely identifying each switch 40 within the storage system. HBA numbers are discrimination information for uniquely identifying each HBA 105 within the storage system.

In addition to basic information for each logical disk 222 (logical disk number, volume size, RAID configuration), the disk management table 530 manages information identifying the access path for each logical disk 222, in a storage system having a plurality of storage apparatuses 20.

After acquiring the disk management table from each storage apparatus 20, logical disk numbers and physical disk numbers and the like may be allocated again so that they become unique values within the storage system.

Figure 19:
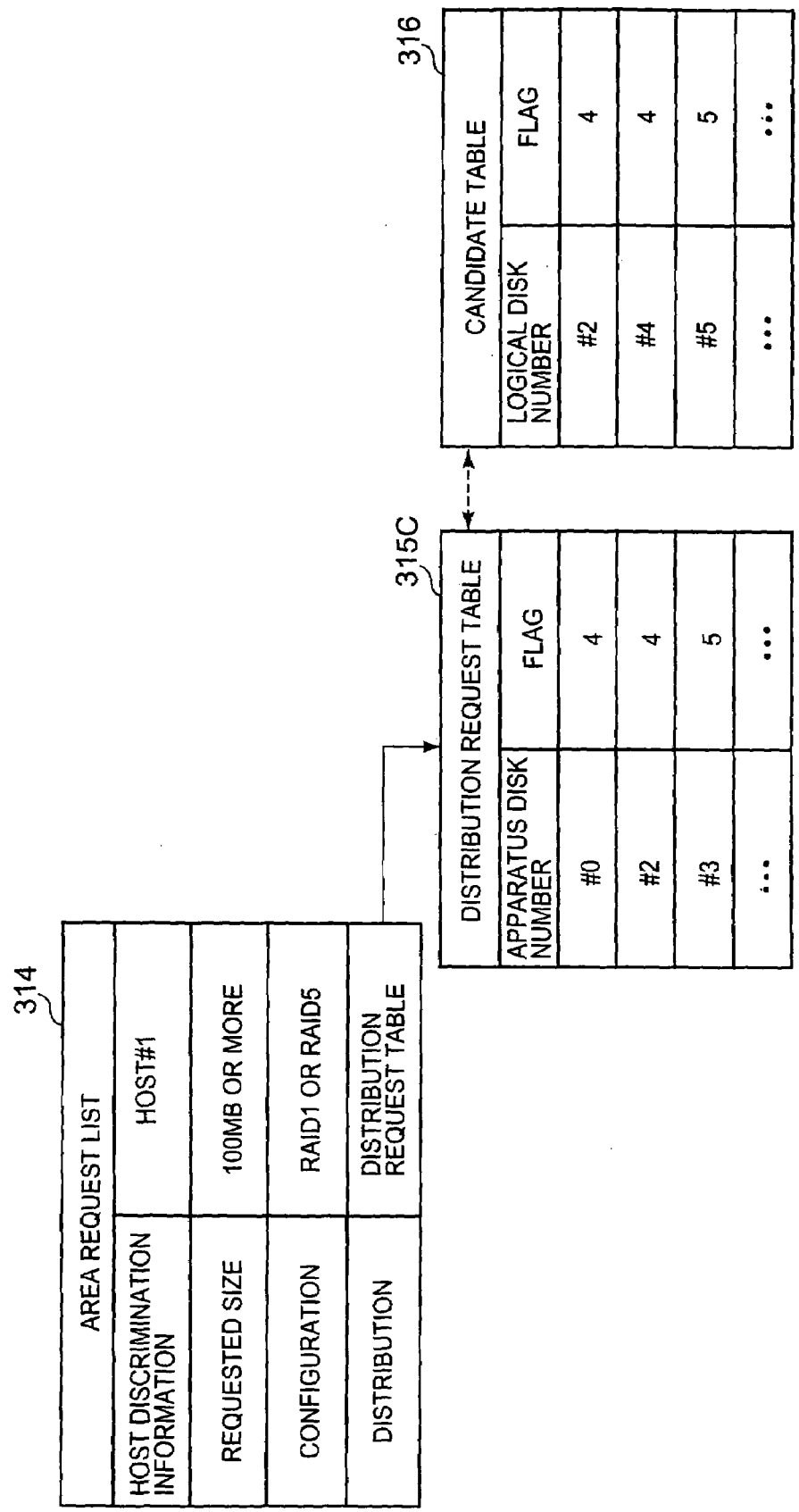
FIG. 19 is a descriptive diagram showing the configuration of the area request list, the distribution request table, and the candidate table.

FIG. 19 is a descriptive diagram showing a configuration example of the distribution request table 315C and the like used in the present embodiment. This distribution request table 315C can be configured by associating, for example, apparatus numbers and flags. As described below, other physical information such as physical disk numbers and HBA numbers and the like may be employed in place of apparatus numbers. The candidate table 316 described below is also shown in FIG. 19.

FIG. 20 is a descriptive diagram showing a configuration example of the file management table 540 used in the present embodiment. This file management table 540 has the same configuration as the file management table 330 shown in FIG. 5, except for the 'apparatus number' column. In other words, the file management table 540 in the present embodiment employs 'apparatus number' in place of the 'logical disk number' in the file management table 330 in the afore-mentioned embodiment. The apparatus number is an example of information indicating physical attributes related to physical disks (disk drive 221) storing files. Information indicating other physical attributes such as the physical disk number, the port number, the switch number, and the HBA number may be used in place of 'apparatus number'. Since the file management table 540 is related to all files existing within the storage system, information indicating physical attributes must be information which can uniquely identify files within the storage system.

Figure 21:
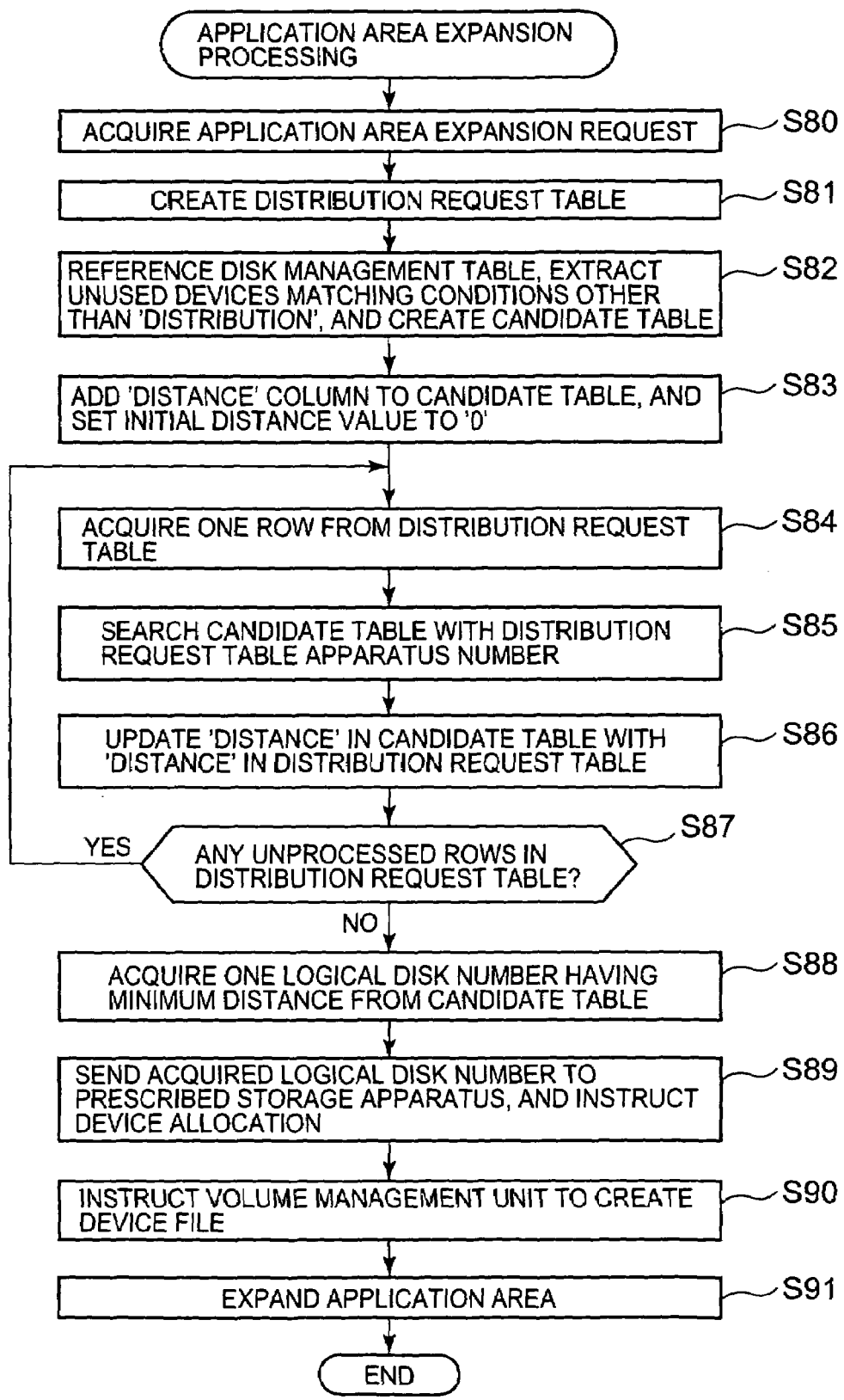
FIG. 21 is a flowchart showing application area expansion processing.
Figure 22:
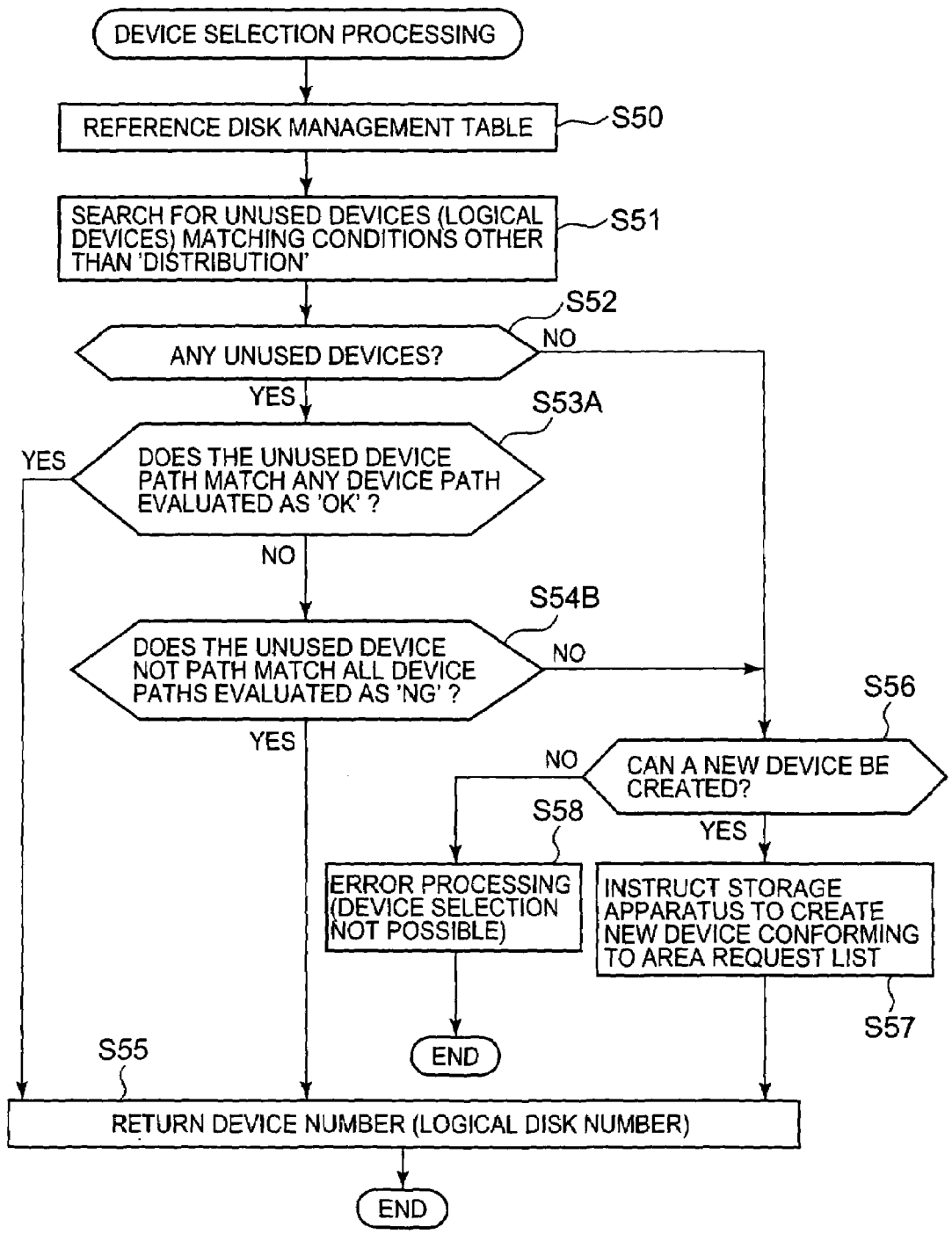
FIG. 22 is a flowchart showing device selection processing.

FIG. 21 is a flowchart showing application area expansion processing according to the present embodiment. The distribution request table 315C is created (S81) when the allocation manager 500 of the management host 30 receives the application area expansion request from the application 110 and the like (S80). Based on the distribution rule table 313A shown in FIG. 14 and the file management table 540, the allocation manager 500 can create the distribution request table 315C including a relative strength indicating whether or not each storage apparatus 20 can be selected as the storage destination.

The allocation manager 500 references the disk management table 530, extracts an unused logical disk 222 satisfying the basic conditions other than 'distribution' (size and RAID configuration), and lists the unused logical disk numbers to create the candidate table 316 (S82). The allocation manager 500 adds the 'distance' column to the candidate table 316, and sets the initial value for distance for each logical disk number to '0' (S83).

Next, the allocation manager 500 takes one row of data from the distribution request table 315C (S84), and searches the candidate table 316 with the apparatus number included in this row (S85). More precisely, the allocation manager 500 searches the candidate table 316 for a logical disk number corresponding to the apparatus number included in that row. Here, the logical disk number corresponding to the apparatus number is an unused logical disk 222 number existing in the storage apparatus 20 identified with that apparatus number.

When the allocation manager 500 finds an unused logical disk number corresponding to the apparatus number, the distance of the unused logical disk number is updated to the distance value set for the apparatus number (S86). The allocation manager 500 executes the steps S85 and S86 for all rows in the distribution request table 315C (S87).

The candidate table 316 is complete when all rows in the distribution request table 315C have been processed (YES in S87). This candidate table 316 associates the logical disk number of the unused logical disk 222 satisfying the basic conditions with the flag (distance) set in the storage apparatus 20 in which that unused logical disk 222 exists.

The allocation manager 500 selects one logical disk number set to the smallest distance from the candidate table 316 (S88). The allocation manager 500 explicitly declares the selected logical disk number for the storage apparatus 20 having an unused logical disk 222 identified with the selected logical disk number, and requests device allocation (S89). Thus, the storage apparatus 20 for which device allocation is instructed makes various settings so that, for example, the specified unused logical disk 222 can be used from the operations host 10.

On the other hand, the allocation manager 500 explicitly declares the selected unused logical disk number for the volume management unit 120 of the prescribed operations host 10, and instructs creation of the device file (S90). When the volume management unit 120 creates the device file, that device file name is returned to the allocation manager 500. When the allocation manager 500 acquires this device file name, the application area is expanded (S91), and processing is terminated.

The present embodiment configured in this manner demonstrates the same benefits as the afore-mentioned first embodiment. Additionally, in the present embodiment, in large-scale storage systems having a plurality of operations hosts 10 and a plurality of storage apparatuses 20, logical disks 222 having suitable physical location relationships can be allocated in consideration of the method of use of files by applications 110.

Fourth Embodiment

Figure 23:
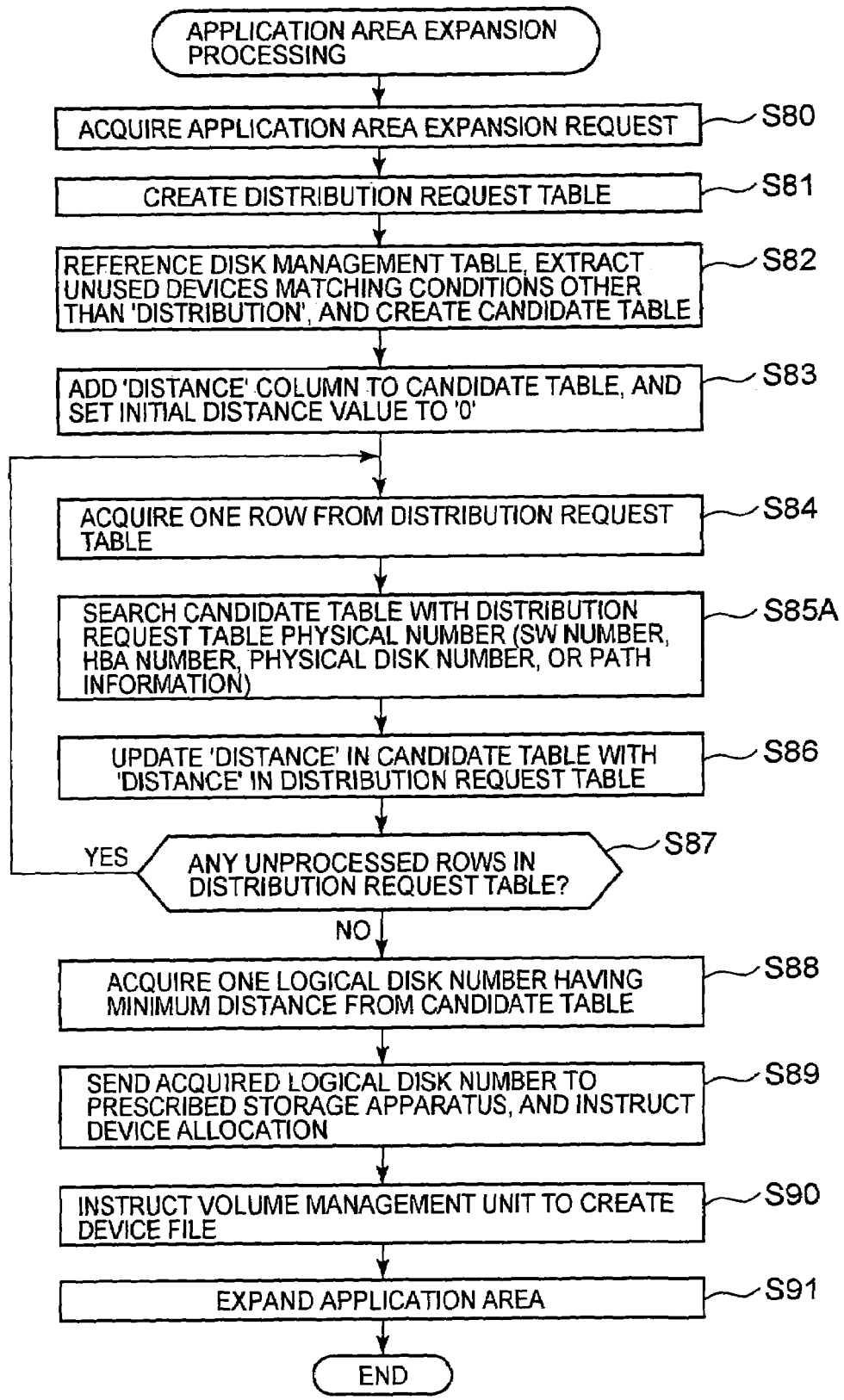
FIG. 23 is a flowchart showing application area expansion processing according to the fourth embodiment.

The fourth embodiment is described based on FIG. 23. The present embodiment is equivalent to a variation of the third embodiment, and uses one of SW number, HBA number, physical disk number, or path information in place of 'apparatus number' as information indicating physical attributes (S85A).

For example, when SW number is employed, a disk drive 221 which can be accessed via the differing switches 40 can be allocated to the application 110. When HBA number is employed, a disk drive 221 which can be accessed via the differing HBAs 105 can be allocated to the application 110.

Fifth Embodiment

Figure 24:
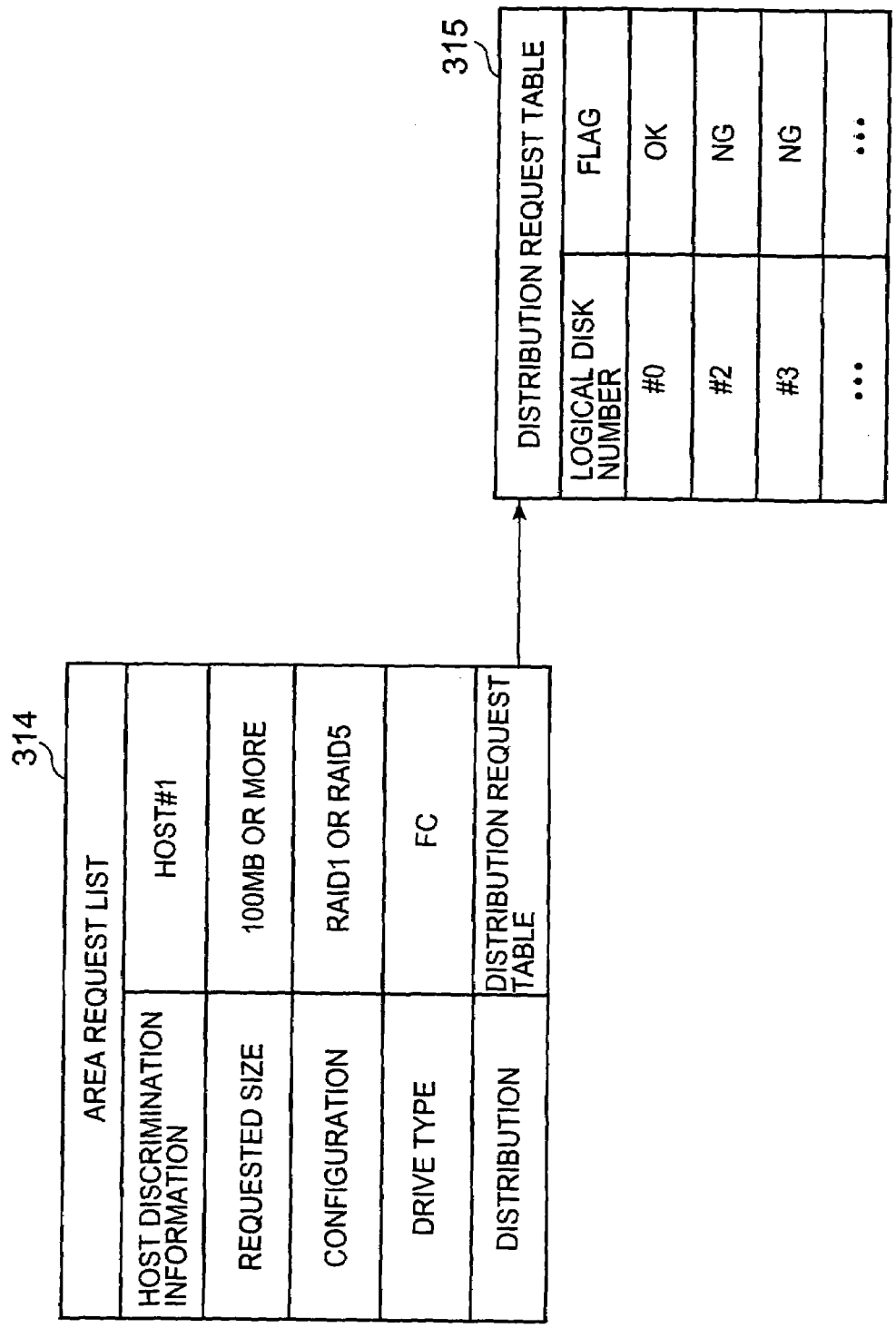
FIG. 24 is a descriptive diagram showing the configuration of the area request list and distribution request table used in the fifth embodiment.

The fifth embodiment is described based on FIG. 24. In the present embodiment, information indicating the type of disk drive 221 is added within the area request list 314. In the example shown in the figure, selection of an FC disk is requested as one of the basic conditions.

While omitted from the figures, in the present embodiment, an example indicating the type of disk drive 221 is added to the disk management table. Thus, an unused logical disk 222 composed of disk drives 221 of the specified drive type can be selected.

Sixth Embodiment

Figure 25:
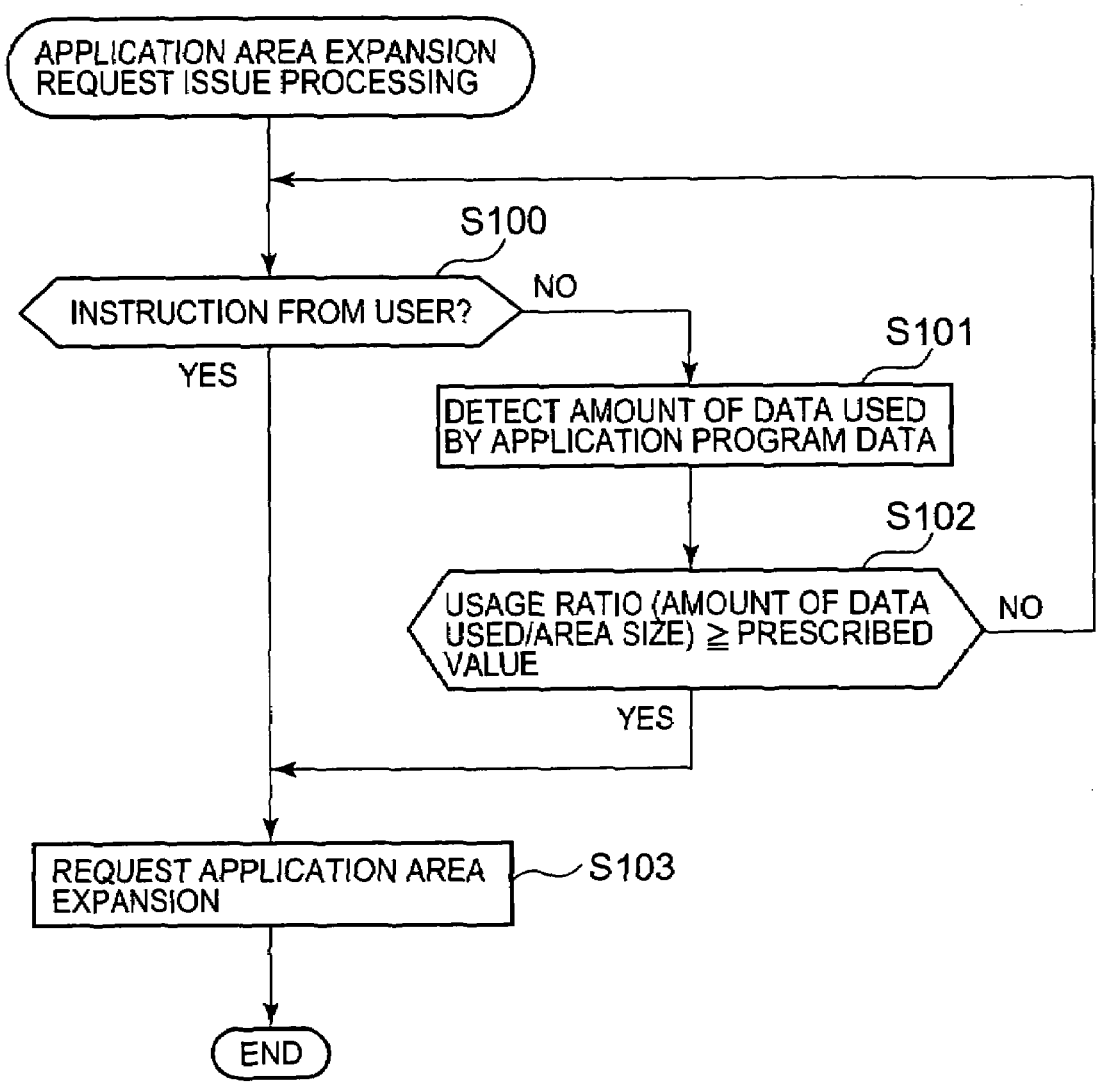
FIG. 25 is a flowchart showing processing for requesting expansion of the application area executed in the sixth embodiment.

The sixth embodiment is described based on FIG. 25. The timing with which the application area expansion request is issued is disclosed in the present embodiment.

FIG. 25 is a flowchart showing processing for issuing an application area expansion request. This processing can be executed by, for example, the operations host 10. Or, this processing can be divided between the operations host 10 and the management host 30, and executed.

For example, when a user such as the system manager and the like determines that the area used by the application 110 is insufficient, expansion of the application area can be requested manually (S100).

When an instruction is received from the user (YES in S100), the operations host 10 requests the management host 30 for expansion of the application area (S103). When an instruction is not received from the user (NO in S100), the operations host 10 detects the amount of data currently used by the application 110 (S101), computes the application area usage ratio from the detected amount of data currently used and application area size, and compares this usage ratio and the preset prescribed value (S102). When the current data usage ratio does not reach the prescribed value (NO in S102), processing returns to S100. When the current data usage ratio does reach the prescribed value (YES in S102), the operations host 10 requests the management host 30 for expansion of the application area (S103).

Thus, an application area expansion request can be issued manually or automatically. When an application area expansion request is issued automatically, logical disks 222 can be allocated autonomously, improving ease of maintenance. Freespace in the storage area can also be employed in place of the amount of data used. In this case, expansion of the application area is requested when freespace becomes equal to or less than the prescribed value.

The present invention is not limited to the afore-mentioned embodiments, and various additions and modifications can be employed by those in the industry provided they do not deviate from the scope of the invention.

What is claimed is:

1. A storage system comprising:
a primary computer on which at least one application program is executed;
a storage apparatus inducing storage of a plurality of data used by the application program on one or a plurality of storage devices; and
a secondary computer connected to the primary computer and the storage apparatus respectively and controlling allocation of storage areas to the application program;
wherein the secondary computer comprises:
a device management information management unit for managing device management information related to each storage device;
a data management information management unit for managing data management information related to each data; and
a control unit for controlling allocation of storage areas to the application program;
and wherein the control unit considers a predetermined physical relationship between a requested storage area and already existing other storage areas using the data management information and the device management information when allocation of a storage area to an application program is requested, selects a storage area as a selected storage area according to characteristics of the data stored in the requested storage area, and issues prescribed instructions to the primary computer and the storage apparatus respectively so that the application program can use the selected storage area.

2. The storage system according to claim 1, wherein conditions other than the physical location conditions related to the requested storage area are included in the storage area allocation request, and the control unit selects the physical location conditions to suit the characteristics of the data stored in the requested storage area, and selects an unused storage area matching the selected physical location conditions.

3. The storage system according to claim 2, wherein physical location conditions are conditions related to storage devices comprising the requested storage area.

4. The storage system according to claim 2, wherein the physical location conditions comprise information indicating whether or not the requested storage area and the other storage areas are to have different physical distribution attributes.

5. The storage system according to claim 2, wherein physical location conditions comprise information indicating the relative strength of whether or not the requested storage area and other storage areas are to have different physical distribution attributes.

6. The storage system according to claim 4, wherein physical distribution attributes of the storage area are either the location of the storage device comprising the storage area, or the access path to the storage device comprising the storage area, or both.

7. The storage system according to claim 2, wherein at least one of requested storage area capacity, types of data stored in the storage area, and logical configuration of the storage area, is included in the other conditions.

8. The storage system according to claim 1, wherein the control unit selects the requested storage area so that the requested storage area is suited to the logical relationship between primary data stored in the requested storage area and secondary data related to the primary data and stored in the other storage area.

9. The storage system according to claim 1, wherein the control unit selects the requested storage area so as to include a storage device comprising the other storage when primary data stored in the requested storage area and secondary data related to the primary data and stored in the other requested storage area are related in such a manner that they may be stored on the same storage device.

10. The storage system according to claim 1, wherein the control unit selects the requested storage area so as to remove the storage device comprising the other storage area when primary data stored in the requested storage area and secondary data related to the primary data and stored in the other requested storage area are related in such a manner that they are to be stored on different storage devices.

11. The storage system according to claim 1, wherein the storage area allocation request includes conditions other than physical location conditions related to storage devices that are to comprise the requested storage area, and the control unit selects storage areas created only by storage devices not comprising the other storage areas and satisfying the other conditions, when primary data stored in the requested storage area and secondary data related to the primary data and stored in the other storage area are related in such a manner that they are to be stored on different storage devices.

12. The storage system according to claim 1, wherein:
the control unit comprises a location conditions determination unit for determining the physical location conditions related to the storage device that is to comprise the requested storage area based on preset distribution rules and the data management information; and
a storage area determination unit for determining the requested storage area based on the determined physical location conditions, the other conditions included in the storage area allocation request, and the device management information.

13. The storage system according to claim 12, wherein the distribution rules can be specified by the creator of the application program or by the user, or by both.

14. The storage system according to claim 1, wherein the storage area allocation requests are issued based on instructions to the primary computer or the secondary computer, or on the amount of data used by the application program.

15. A management computer connected respectively to a primary computer on which at least one application program is executed, and a storage apparatus for storing a plurality of data used by the application program on one or a plurality of storage devices, and controlling allocation of storage areas to the application program, comprising:
a device management information management unit for managing device management information related to the plurality of storage devices;
a data management information management unit for managing data management information related to data; and
a control unit for controlling allocation of storage areas to the application program;
wherein the control unit considers a predetermined physical relationship of a requested storage area and already existing other storage areas using the data management information and the device management information, selects a storage area as a selected storage area in accordance with characteristics of the data stored in the requested storage area, and issues prescribed instructions to the primary computer and a storage apparatus respectively so that the selected storage area can be used by the application program.

16. A storage area allocation method for allocating storage areas comprising storage devices of storage apparatuses to application programs running on a primary computer, comprising the steps of:
receiving requests for allocation of storage areas as requested storage areas to the application programs;
determining physical location conditions related to storage devices that comprise the requested storage areas based on data management information related to data used by the application program, and preset distribution rules, when allocation requests are received;
selecting the requested storage area as a selected storage area based on the determined physical location conditions and other conditions included in the allocation requests, and device management information related to the storage devices; and
issuing prescribed instructions to the primary computer and a storage apparatus so that the selected storage area can be used by the application program.

* * * * *